US012706479B2

(12) United States Patent
Canine et al.

(10) Patent No.: US 12,706,479 B2
(45) Date of Patent: *Aug. 11, 2026

(54) SYSTEM FOR CONTROLLING VOLTAGE AND REACTIVE POWER FOR AN ELECTRICAL GRID

(71) Applicant: WSP USA Inc., Meridian, ID (US)

(72) Inventors: Christopher W. Canine, Great Falls, MT (US); Aaron M. Cowan, Colfax, WA (US)

(73) Assignee: WSP USA Inc., Meridian, ID (US)

( * ) Notice: Subject to any disclaimer, the term of this patent is extended or adjusted under 35 U.S.C. 154(b) by 259 days.

This patent is subject to a terminal disclaimer.

(21) Appl. No.: 18/516,330

(22) Filed: Nov. 21, 2023

(65) Prior Publication Data

US 2024/0146101 A1 May 2, 2024

Related U.S. Application Data

(63) Continuation-in-part of application No. 17/332,029, filed on May 27, 2021, now Pat. No. 11,870,260.

(51) Int. Cl.

*H02J 13/13* (2026.01)
*H02J 3/18* (2026.01)
*H02J 3/38* (2026.01)
*H02J 13/12* (2026.01)
*H02J 101/10* (2026.01)

(Continued)

(52) U.S. Cl.

CPC ............ *H02J 13/1331* (2026.01); *H02J 3/18* (2013.01); *H02J 3/381* (2013.01); *H02J 13/12* (2026.01); *H02J 2101/10* (2026.01); *H02J 2101/22* (2026.01); *H02J 2103/35* (2026.01)

(58) Field of Classification Search

CPC ........ H02J 13/00022; H02J 3/18; H02J 3/381; H02J 13/00002; H02J 2203/10; H02J 2300/20; H02J 3/50; H02J 13/00034; H02J 3/16; Y02E 10/76

See application file for complete search history.

(56) References Cited

U.S. PATENT DOCUMENTS

2005/0042098 A1 2/2005 Wobben
2013/0184894 A1* 7/2013 Sakuma .................... H02J 3/12 700/298

(Continued)

FOREIGN PATENT DOCUMENTS

CA 3160477 5/2021

*Primary Examiner* — Mohammad Ali
*Assistant Examiner* — Dhruvkumar Patel
(74) *Attorney, Agent, or Firm* — Hawley Troxell; Philip McKay

(57) ABSTRACT

A method and system for controlling voltage and/or reactive power for electrical grids includes monitoring the output of the energy generation facilities at the point of interconnection (POI) of each energy generation facility to the power system of the electrical grid. In addition, the voltage at a point of utilization (POU) is monitored to determine when the output voltage of the energy generation facilities must be adjusted to maintain voltage at the POU. In addition, when it is determined that energy generation facilities are exchanging reactive power, the voltage set points of the energy generation facilities are adjusted to reduce the exchanged power.

29 Claims, 6 Drawing Sheets

(51) Int. Cl.
*H02J 101/22* (2026.01)
*H02J 103/35* (2026.01)

(56) References Cited

U.S. PATENT DOCUMENTS

| | | | | |
|---|---|---|---|---|
| 2016/0190810 | A1* | 6/2016 | Bhavaraju | H02J 3/381 307/20 |
| 2017/0338652 | A1* | 11/2017 | Ubben | H02J 3/18 |
| 2018/0076622 | A1* | 3/2018 | Wilkins | H02J 3/381 |
| 2019/0296551 | A1* | 9/2019 | Kawachi | H02J 3/18 |
| 2019/0305556 | A1* | 10/2019 | Caliao | H02J 3/38 |
| 2020/0083710 | A1* | 3/2020 | Ganireddy | H02J 3/38 |
| 2021/0143642 | A1* | 5/2021 | Gupta | H02J 3/001 |

* cited by examiner

SYSTEM FOR CONTROLLING VOLTAGE AND REACTIVE POWER FOR AN ELECTRICAL GRID

RELATED APPLICATIONS

This application is a continuation-in-part of Canine et al., U.S. patent application Ser. No. 17/332,029, filed May 27, 2021, entitled "SYSTEM FOR CONTROLLING VOLTAGE AND REACTIVE POWER FOR AN ELECTRICAL GRID", which is incorporated by reference in its entirety as if it were fully set forth herein.

This application is related to Canine et al., U.S. patent application Ser. No. 18/516,400, naming Christopher W. Canine and Aaron M. Cowan as inventors, filed concurrently with the present application on Nov. 21, 2023, entitled "METHOD FOR CONTROLLING VOLTAGE AND REACTIVE POWER FOR AN ELECTRICAL GRID" which is a continuation-in-part of Canine et al., U.S. patent application Ser. No. 17/332,037, filed May 27, 2021, entitled "METHOD FOR CONTROLLING VOLTAGE AND REACTIVE POWER FOR AN ELECTRICAL GRID", both of which are incorporated by reference in their entirety as if they were fully set forth herein.

BACKGROUND

A significant challenge facing the entire planet in the 21st century is the efficient generation of usable energy. Of particular importance is the need to increase the utilization of renewable energy generation sources such as wind, solar, and hydroelectric.

Currently, renewable energy source-based energy generation facilities exist which include, but are not limited to, wind farms that use wind turbines to transform kinetic wind energy into electrical energy; solar farms that use solar panels to transform solar energy in the form of electromagnetic wave energy into usable electrical energy; and hydroelectric energy generation facilities that use hydroelectric turbines to convert kinetic water energy into usable electrical energy. These and other renewable energy source-based energy generation facilities are critical tools for generating usable energy, typically electrical energy, in an environmentally safe and sustainable manner.

In addition to renewable energy source-based energy generation facilities, traditional fossil fuel-based energy generation facilities are still in common use and are likely to remain in use for quite some time, as humans transition to more environmentally sound and sustainable energy generation sources. These fossil fuel-based energy generation facilities utilize coal, natural gas, oil, etc. to convert chemical energy in the fossil fuels directly into electrical energy by powering drive turbines, or into heat energy that is then used to create steam to drive turbines that convert the chemical/heat energy into usable electrical energy.

In addition to renewable energy source-based energy generation facilities and traditional fossil fuel-based energy generation facilities there are also nuclear based energy generation facilities that convert controlled nuclear reactions into heat energy to create steam to drive turbines to convert the nuclear reaction/heat energy into usable electrical energy.

Herein the term "energy generation facility" includes renewable energy-based energy generation facilities, traditional fossil fuel-based energy generation facilities, nuclear-based energy generation facilities, and any other energy generation facilities, as discussed herein, and/or as known in the art at the time of filing, and/or as developed/made known after the time of filing.

Herein, the terms "electrical grid," "electrical energy generation system," "electrical energy generation grid," "energy generation grid," "grid," are used interchangeably to denote systems and sub-systems used to generate, control, and transmit electrical energy. These can include, but are not limited to, energy generation facilities, substations, reactive components, transmission systems, control units, storage components, and any other components used to generate, control, and transmit electrical energy as discussed herein, and/or as known in the art at the time of filing, and/or as become available/known after the time of filing.

In addition, as used herein, the term "power system" can include, but is not limited to, any system or subsystem capable of transmitting and/or distributing power from one location to another location, as discussed herein, and/or as known/available in the art at the time of filing, and/or as developed/made available after the time of filing. Specific examples of "power systems" include, but not limited to, power distribution systems, power transmission systems, Alternating Current (AC) systems and/or sub-systems, and/or Direct Current (DC) systems and/or sub-systems.

Herein, the terms "line" and "lines," as used for example in the terms "output monitoring lines," "POU monitoring lines," and "control signal lines" include, but are not limited to, any mechanism for transferring data from one point to another point. As specific examples, herein the terms "line" and "lines" can be used to include any wired and/or wireless data transmission or transfer system capable of transferring data or information from one point to another point as discussed herein, and/or as known/available in the art at the time of filing, and/or as developed/made available after the time of filing.

As the world transitions from traditional fossil fuel-based energy generation facilities to renewable energy-based energy generation facilities it will be quite common, and likely to be the case for some time, that renewable energy-based energy generation facilities, traditional fossil fuel-based energy generation facilities, and/or nuclear-based energy generation facilities, will be used, and combined, into hybrid electrical grids. These hybrid electrical grids of interconnected energy generation facilities of various types can then be used to provide usable electrical energy to common power systems of interconnected energy transmission lines.

As more and more hybrid electrical grids are being created, utilizing more and more renewable energy generation facilities, energy sources that are geographically spread out over large distances, and that are often physically removed from the areas where the energy is utilized, must be connected to the same electrical grids using the same power systems. At least two factors contribute to this need. First, renewable energy source based-electric power generation facilities, such as wind farms and solar farms, are often extremely large covering hundreds or thousands of acres. Therefore, these facilities must typically be physically removed from the urban centers they serve/supply. This is required not only to provide space for development of the urban centers, but also due to economic realities, e.g., the cost of large amounts of land near, or in, the urban centers is likely prohibitively high.

In addition, energy generation sources, and particularly renewable energy generation sources, must often be placed in locations where optimum conditions for energy generation exist. For instance, wind farms must be placed where there are optimal wind conditions. Similarly, solar farms must be placed where there is optimal exposure to the sun. Likewise, hydroelectric sources must be near a significant water source. Consequently, the location of renewable energy source-based energy generation facilities is often dictated by the energy generation sources on which they rely and the location of any existing power systems to which they will be connected.

While not necessarily constrained by natural conditions, the placement of traditional fossil fuel-based energy sources must also be chosen carefully to avoid interference with surrounding communities and activities. This need for relative isolation from the communities they serve must be balanced with the need to place these facilities in areas where they can be accessed by fuel suppliers, accessed by employees/technicians, and be connected to existing power systems.

The result is that energy generation facilities are often widely separated from each other and the destination/users of the power generated.

As energy generation facilities of various types are added to an electrical grid, each added energy generation facility increases the amount of electrical energy generated. However, it is important that the voltage on the power systems and the electrical grid be kept relatively constant and within a defined acceptable voltage window, also referred to as a "voltage band." This can be challenging as operating conditions change including, but not limited to, during times of high use; when interruptions such as equipment failures or faults as components of the electrical grid fail or weaken/wear out; and as energy generation facilities are added or taken offline.

The ability of an electrical grid to sustain these changes in operating conditions while maintaining the desired voltage, frequency and power transfer is referred to as the "strength" of the electrical grid. Therefore, a "weak" electrical grid is a grid whose voltage/frequency is relatively susceptible to variation when operating conditions change. On the other hand, a strong electrical grid is less susceptible to voltage/frequency variation when operating conditions change and is said to have a lot of "inertia," i.e., the voltage or frequency does not easily move/change in response to a change in operating conditions.

Electrical grids that include traditional fossil fuel-based energy generation facilities, nuclear-based energy generation facilities, and, for the most part, hydroelectric energy generation facilities are typically strong electrical grids with significant inertia. This is largely because traditional fossil fuel-based energy generation facilities, nuclear based energy generation facilities, and hydroelectric energy generation facilities generally have stable outputs that can be readily controlled by humans simply controlling the operation of the energy generation sources, e.g., humans can maintain the level of power production, voltage, and frequency by speeding up or slowing down the generation equipment and/or by controlling fuels provided, thereby controlling the conditions used to generate electrical energy.

However, energy generation facilities based on renewable energy sources such as wind or solar are subject to non-human controlled changes in conditions required to generate electrical energy. For instance, the energy generated at any given time by energy generation facilities relying on solar energy generation sources, such as solar farms, is variable and subject to natural changes in available solar power due to time of day/night and weather conditions. Likewise, the energy generated at any given time by energy generation facilities relying on wind driven energy generation sources, such as wind farms, is also highly variable and subject to natural changes in both wind magnitude and direction because wind is essentially a vector quantity. Similarly, but typically to a much lesser extent, the energy generated at any given time by energy generation facilities relying on water driven energy generation sources, such as hydroelectric turbines, can be variable and subject to the magnitude of water flowing which may or may not be subject to human control.

Consequently, when renewable energy source-based energy generation facilities are added to the electrical grids, these energy generation facilities often fail to provide any significant level of strength to the electrical grid. That is to say, while energy generation facilities based on renewable energy sources increase the amount of electrical energy generated/provided to the electrical grid, they often lack the stability of energy generation needed to provide a stable voltage level on the electrical grid. This can cause the electrical grid to become weaker with less inertia. Therefore, during times of high use, or following other interruptions such as equipment failures or faults, or other changes in operating conditions, the voltage on these electrical grids can be unstable and readily vary outside the desired voltage window unless corrective measures are taken.

To support the electrical grid, each connected energy generation facility must regulate the output voltage of the connected energy generation facility at its point of interconnection (POI) to the power system and electrical grid so that the voltage on the power system and electrical grid is kept stable. This point of interconnection for each energy generation facility is typically the physical point of interconnection to the power system of the electrical grid, or an electrical equivalent of the point of interconnection to the power system of the electrical grid. As such, the point of interconnection for a given energy generation facility may be hundreds of miles away from the location where the generated power is utilized and/or combined with other energy generation facilities. This can result in a difference between the calculated/theoretical voltage on the power system and electrical grid, calculated based on the desired output voltages of the various energy generation facilities, and the actual voltage on the power system and electrical grid at a point physically and/or electrically removed from the actual/physical points of interconnection.

One factor contributing to this issue that must be taken into account on any power system and electrical grid is reactive power and its impact on power system and electrical grid voltage. Consequently, there is a need to monitor and control reactive power on the power system and electrical grid.

Reactive power can best be described as the quantity of power that is developed by reactive components in an alternating current (AC) circuit or system, including power systems and electrical grids.

In a direct current (DC) circuit, the product of voltage (V), in Volts, and current (I), in Amps, i.e., "Volts×Amps" gives the power (P), in watts, i.e., "P=IV." However, while this relationship is also true for purely resistive AC circuits/systems, the situation is slightly more complex when reactive components and factors, i.e., inductive and capacitive components and factors, are present in an AC system, as is the case in a power system and electrical grid. In these cases, the Volt-Amp product, now defined as apparent power, becomes a complex value consisting of both real and reactive components that vary with the amount of current transferred. Given that electrical energy transmitted over power systems and electrical grids is AC and is transmitted over transmission lines of the power system that include reactive components, this is a significant issue/factor for the electrical grids.

In an AC circuit, such as a power system and electrical grid with reactive components, e.g., capacitive or inductive components/factors, the voltage and current waveforms will be "out-of-phase" by some amount determined by the phase angle "phi" between the voltage and current waveforms. In this case, in order to determine the "real power", also called active power, (P), there is a need to account for not only the Volt-Amp product but also the phase angle difference between the voltage and the current waveforms given by the equation: VI cos(phi).

Then we can write the relationship between the apparent power and active power as:

Active Power ($P$)=Apparent Power ($S$)×Power Factor (PF)

Where: Power Factor (PF)=$P$ in Watts/$S$ in Volt-Amperes

Note that power factor (PF) is defined as the ratio between the active power in watts and the apparent power in Volt-Amperes and indicates how effectively electrical power is being used.

In addition, a particularly important consideration in the field of power systems of electrical grids is reactive power, sometimes referred to as "imaginary power". Reactive power is typically given the symbol "Q." Reactive Power is expressed in a unit called "volt-amperes reactive", or "var." Consequently, reactive power is sometimes loosely referred to as "VAR" "VAr" or "vars."

The relationship between reactive power (Q), voltage (V), and current (I) is given by Q=VI sin(phi), where phi is again the phase angle between the voltage and current waveforms.

Reactive power is not really power at all but represents the product of voltage and current that are out-of-phase with each other. However, reactive power is a crucial factor of power systems and electrical grids because reactive power is the portion of electricity that helps establish and sustain the electric and magnetic fields required by alternating current equipment making up energy generation systems, power systems, and electrical grids. The amount of reactive power present in power systems and electrical grids will depend upon the phase shift or phase angle between the local voltage and the current and, just like active power, reactive power can be "produced" or "absorbed".

Reactive power is a factor for most types of electrical equipment that use a magnetic field, such as motors, generators and transformers. Importantly, as noted, reactive power is also a factor, and required, to supply the reactive losses on power transmission and distribution lines.

The main advantage of using AC electrical power distribution in power systems and electrical grids is that the voltage levels can be changed using transformers. However, reactive power takes up space on the transmission lines of the power systems since larger conductors and transformers are required to handle the larger currents.

For power systems and electrical grids, reactive power provides the important function of regulating the voltage thereby helping to move real power effectively through the transmission lines of the power systems and electrical grids to where it is required/used. This, as discussed above, helps provide a strong electrical grid with good inertia.

Consequently, while reducing reactive power to help improve the power factor and system efficiency is a good thing, a sufficient quantity of reactive power is required to control the voltage on the power systems and electrical grid and overcome the losses in the transmission lines making up the power systems and electrical grid. This is because if the reactive power is not high enough, active power cannot be transferred. However, having too much reactive power can increase current, causing excess heating ($I^2R$ losses) and, importantly, undesirable voltage drops and loss of power along the power systems of electrical grids that can result in unstable, or undesired, voltage levels and unacceptable real power transferred.

Since increasing reactive power increases system losses, it must be monitored and controlled in electrical systems such as power systems of electrical grids to ensure that the voltage remains relatively steady without causing excess losses due to inefficient use.

With respect to power systems and electrical grids, each energy generation facility connected to the power system provides or absorbs reactive power to/from the electrical grid at its point of interconnection. The amount of reactive power provided/absorbed is typically a percentage of the capability of a given energy generation facility. Ideally, the amount of reactive power provided/absorbed by each energy generation facility within a given area would be the same percentage of the capability of every other energy generation facility. In short, ideally, the reactive power need for the electrical grid would be shared evenly between the energy generation facilities, with each energy generation facility providing its share of reactive power as the same percentage of its capability.

However, as noted above, due to the transient/unstable nature of the power generated by renewable energy source-based energy generation facilities, such as wind and solar based energy generation facilities, the ability to control voltage and reactive power provided by these energy generation facilities can vary greatly from minute to minute as winds gust and/or wane, cloud cover comes and goes, and various other weather and/or operating conditions change. As the individual output voltages at the point of interconnection of energy generation facilities adjust to changes in generation, energy generation facilities that are relatively close to each other and are connected to the power systems of the electrical grids at the same point of interconnection, or in relatively close physical and/or electrical proximity, can begin to exchange reactive power with each other. In this case, one energy generation facility can end up providing reactive power to another energy generation facility and/vice versa.

Over time, it is possible that the energy generation facilities connected to the same power systems and electrical grids at the same point of interconnection will drift apart to the point that some energy generation facilities will be producing reactive power while others are absorbing reactive power. This "exchange of reactive power" between energy generation facilities results in increased losses, reduced equipment capacity, and other significant problems without contributing to the overall power generation of the energy generation facilities.

In extreme situations this variability in reactive power can cause energy generation facilities to drive to opposite limits of their capabilities, with some energy generation facilities supplying a large amount of reactive power and others absorbing a large amount of reactive power. Although this difference in output may settle to a stable point where voltage is held to the desired level, the bulk of the reactive power is simply exchanged between the energy generation facilities and does little to contribute to the operation of the power systems or the electrical grids. In short, in an ideal situation, the same net effect on voltage could be obtained at a reduced reactive power output while also lowering the losses caused by the unnecessary reactive power flow.

Several prior art systems and methods have been developed in attempts to monitor and control reactive power and maintain consistent voltage on power systems and electrical grids. However, these prior art systems suffer from significant shortcomings and/or cannot readily accommodate larger electrical grids and/or energy generation facilities that utilize renewable energy generation sources.

Some prior art systems use a simple "voltage droop" system and are said to operate in voltage control mode using voltage droop. Voltage droop systems purposefully reduce the accuracy of the required output voltage of energy generation facilities, thereby introducing a droop error margin that can accommodate output voltage variations at the points of interconnection. However, the inaccuracies introduced in voltage droop mode can cause the energy generation facilities to exchange reactive power with each other.

These prior art voltage droop systems work acceptably well in situations where relatively few, e.g., one or two, energy generation facilities are operating in close electrical proximity to each other, and the electrical grid is strong. In fact, voltage control systems, including those using voltage droop, have the distinct advantage of allowing the system to react/adapt quickly to changes in operating conditions at the energy generation facilities and on the power systems and electrical grid. This makes the energy generation facilities operating in voltage control mode and using voltage droop extremely adaptable and efficient. However, as noted, prior art voltage controlled systems, particularly those using voltage droop methods, still result in the reactive power exchanges discussed above and do not work well in situations where more than relatively few, e.g., one or two, energy generation facilities are present and/or are not operating, or do not have points of interconnection in close physical and electrical proximity to each other. Consequently, while prior art voltage-controlled systems, including those implementing voltage droop, have some very desirable features, these systems are often replaced with prior art systems that are designed to more directly/closely monitor and control reactive power.

One example of prior art systems designed to more directly/closely monitor, and control, reactive power are prior art electrical grid master controller systems. One specific example of prior art electrical grid master controller systems are Master Var Controller (MVC) systems. Prior art MVC systems typically facilitate the monitoring, regulation and adjustment of multiple energy generation facilities by controlling to reactive power rather than voltage. These prior art MVC-based methods and systems typically measure existing reactive power, typically at a single point of interconnection, of multiple energy generation facilities to the power systems of the electrical grids. As a result, and as discussed in more detail below, prior art MVC-based methods and systems are typically controlled to reactive power as opposed to output voltage of the energy generation facilities. Since using prior art MVC-based methods and systems the energy generation facilities are controlled to reactive power and not voltage, the energy generation facilities do not operate with the efficiency and rapid response advantages of voltage control operation discussed above.

FIG. 1 is a simplified block diagram of a prior art electrical grid 100 utilizing a prior art master controller system in the form of a prior art MVC 180.

As seen in FIG. 1, in this specific illustrative and simplified example, prior art electrical grid 100 includes: energy generation facilities 101, 103, 105, and 107; power system 170; MVC 180; reactive power measurement/monitoring line 182, in communication with MVC 180; and control signal data transfer systems 181, 183, 185, and 187, in communication with energy generation facilities 101, 103, 105, and 107, respectively, and MVC 180.

As seen in FIG. 1, in this specific illustrative and simplified example, energy generation facilities 101, 103, 105, and 107 include energy generation sources 111, 113, 115, and 117, respectively, in communication with control units 121, 123, 125, and 127, respectively, by control signal data transfer systems 141, 143, 145, and 147, respectively.

As also seen in FIG. 1, in this specific illustrative and simplified example, energy generation sources 111, 113, 115, and 117 include output terminals 131, 133, 135, and 137, respectively, with output terminals 131 and 133 being coupled at points 151 and 153 and each other, and output terminals 135 and 137 being coupled at points 155 and 157, and each other. As also seen in FIG. 1, in this specific illustrative and simplified example, points 151 and 153 are coupled to point 162 and points 155 and 157 are coupled to point 160. Finally, in this specific illustrative and simplified example, points 160 and 162 are coupled to single point of interconnection POI 172 so that output terminals 131, 133, 135, and 137 of energy generation facilities 101, 103, 105, and 107 are electrically coupled to the same point, i.e., point of interconnection POI 172.

In operation, MVC 180 measures existing reactive power at the single point of interconnection POI 172 of the multiple energy generation facilities 101, 103, 105, and 107 to power system 170 via reactive power measurement/monitoring line 182.

MVC 180 compares the reactive power measured at point of interconnection POI 172 with a desired reactive power value calculated to provide the needed voltage on the power systems of the electrical grids. If it is determined by MVC 180 that changes in reactive power are needed at the single point of interconnection POI 172, then the appropriate control signals are generated and provided to control units 121, 123, 125, and 127 of energy generation facilities 101, 103, 105, and 107, respectively, by correction/operational control signal data transfer systems 141, 143, 145, and 147, respectively.

Once the control signals are generated and provided to control units 121, 123, 125, and 127 of energy generation facilities 101, 103, 105, and 107, respectively, control units 121, 123, 125, and 127 send correction/operational control signals to energy generation sources 111, 113, 115, and 117, respectively, by correction/operational control signal data transfer systems 141, 143, 145, and 147, respectively. The correction/operational control signals then change the operation parameters/reactive power set point of energy generation sources 111, 113, 115, and 117 to theoretically provide the desired reactive power at single point of interconnection POI 172. Consequently, MVC 180 controls the energy generation facilities 101, 103, 105, and 107 to reactive power at the single point of interconnection POI 172, as opposed to controlling to voltage at each of the energy generation facilities 101, 103, 105, and 107.

In the discussion above with respect to FIG. 1 and prior art electrical grid 100, four energy generation facilities 101, 103, 105, and 107 were described. However, those of skill in the art will readily understand that any number of energy generation facilities could be used with prior art electrical grid 100. In addition, those of skill in the art will recognize that prior art electrical grid 100 is simplified and illustrative only. Actual prior art electrical grids would have numerous additional components and features. These components and features were not included in the discussion above or in FIG. 1 for simplicity and to avoid detracting from the basic structure and systems being illustrated.

As discussed above, prior art MVC-based methods and systems utilize reactive power set points, i.e., control to reactive power, instead of using voltage set points to control to voltage. To this end, prior art MVC-based methods and systems, such as prior art electrical grid 100, typically use one or more MVCs, such as MVC 180, to measure existing reactive power; typically, at a single point of interconnection, such as POI 172, of multiple energy generation facilities, such as 101, 103, 105, and 107, to the power systems, such as power systems 170, of the electrical grids, such as prior electrical grid 100. Then these prior art MVC-based methods and systems calculate desired reactive power changes needed at the single point of interconnection in order to control voltage on the power systems and the electrical grids. Consequently, these prior art methods and systems utilize reactive power set points, i.e., control to reactive power, instead of using voltage set points to control to voltage.

As noted, prior art MVC-based methods and systems typically coordinate the output of multiple energy generation facilities by adjusting the reactive power output at the single point of interconnection. This makes the adjustment of reactive power sensitive to control and allows for control of an electrical grid made of larger numbers of energy generation facilities. In short, using prior art MVC-based methods and systems, reactive power is balanced natively and theoretically as part of the MVC. However, since these prior art MVC-based methods and systems control to reactive power and do not leave the energy generation facilities in voltage control mode, prior art MVC-based methods and systems are unable to respond rapidly to electrical grid disturbances as is needed when connecting to a weaker electrical grid, such as an electrical grid including renewable power source-based electrical energy generation facilities.

For instance, studies have shown that taking certain elements out of service may result in temporary voltage levels on power system 170 of up to 1.20 per unit (pu), i.e., twenty percent above nominal. In these cases, the energy generation facilities must be in voltage control mode to respond quickly enough to avoid tripping off. Typically, since in normal operation prior art MVC-based methods and systems are in reactive power control mode, prior art MVC-based methods and systems are not able to respond quickly and "ride through" the disturbances.

Part of this inability of prior art MVC-based methods and systems to respond rapidly to electrical grid disturbances lies in the fact that in order to address any electrical grid disturbances, the control system must first be switched form reactive power control mode to voltage control mode. This can take significant time, e.g., on the order of seconds, in which time the energy generation facilities will already have tripped offline. This situation not only leaves this prior art MVC-based methods and systems unable to response quickly but is also highly inefficient and, in some cases, unreliable. This is a significant weakness in prior art MVC-based methods and systems because the ability to respond rapidly to electrical grid disturbances and "ride through" and respond rapidly to electrical grid disturbances is critical; particularly when renewable energy generation source-based energy generation facilities are involved.

In addition, prior art electrical grid master controller systems, such as MVC systems, are not well suited to electrical grids where the energy generation facilities are significant distances apart due to inadequate coordination capabilities for these widely geographically distanced systems.

In addition, some prior art systems employ temporarily designated "master" controllers that are in fact local energy generation facility control units that have are simply designated as "master" controllers. This architecture is sometimes referred to as a "multi-master" architecture.

These prior art "multi-master" systems have several drawbacks. First, when any updates or changes must be made to the local energy generation facility control units, the designated "master active controller" being itself just a designated one of the local energy generation facility control units must be updated as well. As a result when the designated "master active controller" is down for updates, or for any reason, the control functions for the entire system can be lost while the updates or changes to the designated "master active controller" are performed.

To address this issue, these "multi-master" systems typically must designate a "standby master controller" and "secondary controller." This is not only inefficient, but also results in an overly complicated system.

As the world transitions to renewable energy generation sources, electrical grids will be more and more widely physically disbursed, more and more electrical grids will be designed to include renewable energy source-based energy generation facilities, and more and more renewable energy source-based energy generation facilities will be added to existing electrical grids. Consequently, the need to accommodate and control the variable output of renewable energy source-based energy generation facilities, i.e., to accommodate weaker electrical grids and control reactive power on these weaker electrical grids will become more pronounced. Likewise, there will be a need to more adequately control electrical grids spread out over large distances.

As discussed above, prior art methods and systems for controlling power system voltages and reactive power productions are not well suited for use with electrical grids that include renewable energy source-based energy generation facilities and/or energy generation facilities that are physically separated by large distances.

What is needed is a method and system for effectively and efficiently controlling power system voltages and reactive power production to accommodate renewable energy source-based energy generation facilities and the resulting potentially weaker electrical grids as well as electrical grids with energy generation facilities that are separated by large physical distances.

SUMMARY

Embodiments of the present disclosure provide a solution to the long-standing technical problem of effectively and efficiently controlling power system voltages and reactive power production to accommodate renewable energy source-based energy generation facilities and the resulting potentially weaker electrical grids as well as electrical grids with energy generation facilities that are separated by large physical distances.

In addition, those of skill in the art will readily recognize that embodiments of the present disclosure provide a solution to the long-standing technical problem of effectively and efficiently controlling power system voltages and reactive power production that can be of benefit to any electrical grid including relatively strong electrical grids. Not only is this beneficial to the existing strong electrical grids, but it also makes the existing strong electrical grids more flexible and able to accommodate renewable energy source-based energy generation facilities in the future. Consequently, the embodiments of the present disclosure can be used with, and be of benefit to, virtually any electrical grid.

In one embodiment, the outputs of the energy generation facilities at the point of interconnection (POI) of each energy generation facility to the power system of the electrical grid are monitored. In various embodiments, the output data from each energy generation facility includes, but is not limited to, real power, reactive power, voltage, breaker status, and/or any other energy generation facility output data, as discussed herein, and/or as known in the art at the time of filing, and/or as becomes known/available after the time of filing.

In one embodiment, at least one Point Of Utilization (POU) is identified/designated. The voltage at the at least one POU is then also monitored to determine when the output voltage of the energy generation facilities must be adjusted to maintain the voltage at the POU within a desired band and thereby provide electrical grid stability.

In various embodiments, the at least one POU can be a point at a sub-component of the electrical grid such as a substation or switching station, or any other point of the electrical grid desired, as discussed herein, and/or as known in the art, and/or as developed after the time of filing.

In some embodiments, at least one POU is separate and distinct, and/or physically removed, from any POI of any of the energy generation facilities. In other embodiments, at least one POU may be a POI for one or more energy generation facilities.

In various embodiments, the POU data includes but is not limited to, real power, reactive power, voltage, breaker status, and/or any other POU data desired and/or needed as discussed herein, and/or as known in the art, and/or as developed after the time of filing.

In one embodiment, if it is determined that voltage at the POU is outside of the desired band, the voltage control set points of all controlled energy generation facilities are adjusted in a manner appropriate to bring the output at the voltage at the POU back into the desired band.

In addition, in one embodiment, the output of the energy generation facilities is also monitored to identify locations where reactive power is being exchanged between energy generation facilities. When locations where reactive power is being exchanged between energy generation facilities are identified, the outputs of the energy generation facilities involved are adjusted to limit the reactive power exchange. In one embodiment, the outputs of the energy generation facilities are adjusted so that the production of reactive power for the power system of the electrical grid is shared relatively equally across all the energy generation facilities near the POU; in one embodiment, as a common percentage of the maximum reactive power capabilities of each of the energy generation facilities.

Whereas prior art systems, such as MVC systems, controlled the reactive power output at a single point of interconnection, the disclosed methods and systems for controlling voltage and reactive power control the voltage at each of the points of interconnection of each of the energy generation facilities. In one embodiment, the methods and systems for controlling voltage and reactive power for electrical grids thereby allow the individual energy generation facilities to operate in voltage control mode, and in some cases, to implement voltage droop. In one embodiment, voltage control is achieved by adjusting voltage set points of the energy generation facilities up or down in user defined predetermined discrete steps that can be defined and/or changed as desired/needed. This allows the reactive power output of the energy generation facilities to be flexibly adjusted and controlled when needed while, at the same time, leaving energy generation facilities able to respond to electrical grid disturbances using the advantages of voltage control mode operation.

As noted, using the disclosed methods and systems, data is collected and monitored from the points of interconnection of each of the energy generation facilities and a POU. The energy generation facilities are then controlled to voltage at their respective POIs rather than to reactive power at a single POI. Consequently, the disclosed methods and systems can accommodate all types of energy generation facilities, including renewable energy source-based energy generation facilities, while maintaining a stable voltage for the power system and the electrical grid. The additional supervision of reactive power exchange between energy generation facilities also allows for control of energy generation facilities spread out over a large geographic area while maintaining control at a single, central location.

For these and numerous other reasons discussed herein, the disclosed methods and systems, and any electrical grid utilizing the disclosed methods and systems, represents a significant improvement over the prior art methods and systems.

In one embodiment, the methods and systems for controlling voltage and reactive power for electrical grids utilize a Master Grid Controller (MGC).

In one embodiment, the disclosed MGC measures the outputs of the energy generation facilities under its control at the POI of each energy generation facility to the power system of the electrical grid. In addition, the disclosed MGC measures the voltage at the POU to determine when the output voltage of the energy generation facilities must be adjusted to maintain voltage at a POU within a desired voltage band and thereby provide electrical grid stability.

In one embodiment, when the disclosed MGC determines that voltage at the POU is outside of the desired band, it adjusts the voltage control set points of all controlled energy generation facilities in a manner appropriate to bring the voltage at the POU into the desired band.

In addition, in one embodiment, the disclosed MGC compares the output of the energy generation facilities to identify locations where reactive power is being exchanged between energy generation facilities. The disclosed MGC then adjusts outputs of the energy generation facilities involved to limit the reactive power exchange. The disclosed MGC also adjusts outputs of the energy generation facilities so that the production of reactive power for the power system of the electrical grid is shared relatively equally across all the energy generation facilities under the MGC's control.

In contrast to prior art master control systems, such as MVC systems that controlled to reactive power, typically at a single point of connection, the methods and systems for controlling voltage and reactive power for electrical grids control to voltage. In one embodiment, the methods and systems for controlling voltage and reactive power for electrical grids thereby allow the individual energy generation facilities to operate in voltage control mode and use the disclosed MGC to adjust voltage set points of the energy generation facilities up or down in predetermined discrete steps. This allows the reactive power output of the energy generation facilities to be flexibly adjusted and controlled when needed while, at the same time, leaving energy generation facilities able to respond to electrical grid disturbances using the advantages of voltage control mode operation.

As noted, the disclosed MGC collects data from the points of interconnection of each of the energy generation facilities and a POU. In addition, the disclosed MGC controls to voltage rather that reactive power. Consequently, the disclosed MGC can accommodate all types of energy generation facilities, including renewable energy source-based energy generation facilities, while maintaining a stable voltage for the power system and the electrical grid. The additional supervision of reactive power exchange between energy generation facilities also allows the disclosed MGC to control energy generation facilities spread out over a large geographic area while maintaining control at a single, central location.

One embodiment of the disclosed MGC includes the ability to log all measured data, calculations, and operations on a continuous basis. This allows for the downloading of log data for review as needed and for providing unique data to determine operational set points and verify proper functionality.

In various embodiments, the output data from each energy generation facility includes, but is not limited to, real power, reactive power, voltage, breaker status, and/or any other energy generation facility output data relevant to MGC operation, as discussed herein, and/or as known in the art at the time of filing, and/or as becomes known/available after the time of filing.

In one embodiment, the disclosed MGC collects POU data at a POU. In various embodiments, the POU can be a point at a sub-component of the electrical grid such as a substation or switching station, or any other point of the electrical grid desired, as discussed herein, and/or as known in the art, and/or as developed after the time of filing.

In some embodiments, the POU is separate and distinct, and/or physically removed, from any POI of any of the energy generation facilities. In other embodiments, the POU may be a POI for one or more energy generation facilities.

In various embodiments, the POU data includes but is not limited to, real power, reactive power, voltage, breaker status, and/or any other POU data relevant to MGC operation, as discussed herein, and/or as known in the art at the time of filing, and/or as becomes known/available after the time of filing.

In one embodiment, the disclosed MGC uses the energy generation facility output data and POU data to determine adjustments for each energy generation facility and to coordinate the reactive power support provided by each energy generation facility and/or other reactive power devices in the area of the POU and under control of the disclosed MGC.

In one embodiment, the disclosed MGC utilizes any number of data sources, reactive power devices, and operational rules. Unlike prior art master control systems, such as MVC systems, which measured existing reactive power and calculated desired reactive power changes in order to control voltage, the disclosed MGC instead adjusts energy generation facility output voltage up or down. Therefore, the disclosed MGC allows for more stable control over a wider area.

In one embodiment, since using the disclosed MGC the energy generation facilities are controlled to voltage rather than reactive power, the energy generation facilities can operate in voltage control mode to maintain the voltage at their point of interconnection. Consequently, the electrical grids using the disclosed MGC are provided the advantages of the prior master control units while also receiving the benefits of the rapid reaction times and ability to ride through disturbances of energy generation facilities operating with voltage droop.

As discussed above, the disclosed MGC accommodates all types of energy generation facilities, in any combination, including renewable energy source-based energy generation facilities and any other energy generation facilities having fluctuating and unpredictable outputs. Consequently, the disclosed MGC is well suited to potentially weaker electrical grids.

In addition, in one embodiment, when the disclosed MGC determines one or more energy generation facilities may be exchanging reactive power the MGC adjusts the voltage set points of the energy generation facilities to reduce the exchanged power. Consequently, using the disclosed MGC the increased losses, reduced equipment capacity, and other problems associated with the excessive exchange of reactive power that does not contribute to the overall power generation of the energy generation facilities is avoided.

In addition, the disclosed MGC can be customized for a wide variety of installations and can therefore be applied to a wide variety of projects and numerous electrical grid configurations.

As noted above, some prior art systems employ temporarily designated "master" controllers that are in fact local energy generation facility control units that have are simply designated as "master" controllers. This architecture is sometimes referred to as a "multi-master" architecture.

These prior art "multi-master" systems have several drawbacks. First, when any updates or changes must be made to the local energy generation facility control units, the designated "master active controller" being itself just a designated one of the local energy generation facility control units must be updated as well. As a result when the designated "master active controller" is down for updates, or for any reason, the control functions for the entire system can be lost while the updates or changes to the designated "master active controller" are performed.

To address this issue, these "multi-master" systems typically must designate a "standby master controller" and "secondary controller." This is not only inefficient, but also results in an overly complicated system.

In contrast, the disclosed methods and systems utilize a dedicated MGC that is separate and distinct from any of the controls units of any of the energy generation facilities under the control of the disclosed MGC. Therefore, using the disclosed methods and systems, the complications and inefficiencies of prior art "multi-master" systems is avoided.

For these and numerous other reasons discussed herein, the disclosed MGC, and any electrical grid utilizing the disclosed MGC, represents a significant improvement over the prior art methods and systems.

Therefore, the embodiments of the present disclosure provide a solution to the long-standing technical problem of effectively and efficiently controlling power system voltages and reactive power productions to accommodate renewable energy source-based energy generation facilities and the resulting potentially weaker electrical grids.

Figure 1:
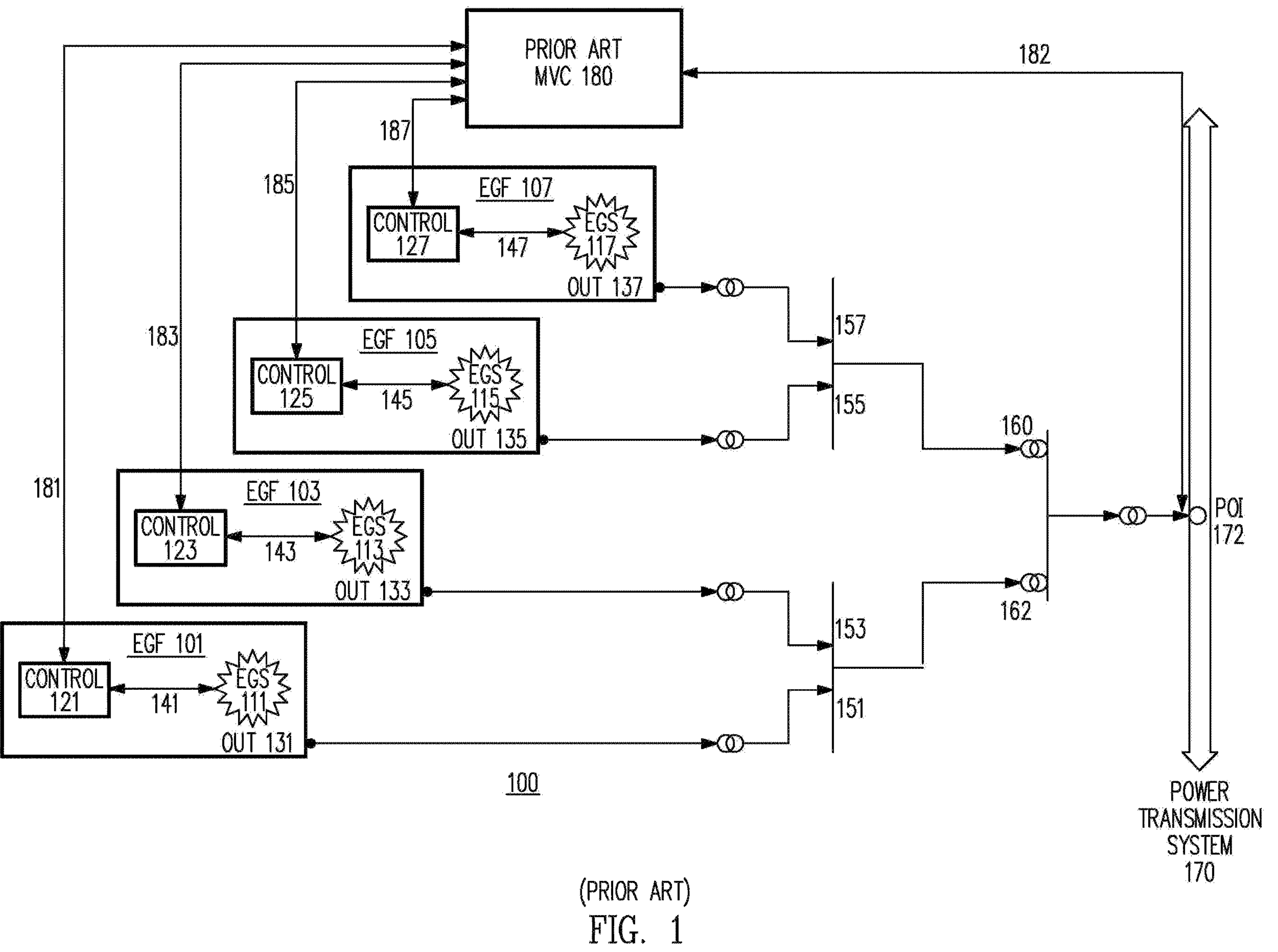
FIG. 1 is a simplified block diagram of a prior art electrical grid 100 utilizing a prior art Master Var Control (MVC) system.

Common reference numerals are used throughout the figures and the detailed description to indicate like elements. One skilled in the art will readily recognize that the above figures are merely illustrative examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying figures, which depict one or more exemplary embodiments. Embodiments may be implemented in many different forms and should not be construed as limited to the embodiments set forth herein, shown in the figures, or described below. Rather, these exemplary embodiments are provided to allow a complete disclosure that conveys the principles of the invention, as set forth in the claims, to those of skill in the art.

Definitions

Herein the term "energy generation facility" includes renewable energy-based energy generation facilities, traditional fossil fuel-based energy generation facilities, nuclear-based energy generation facilities, and any other energy generation facilities, as discussed herein, and/or as known in the art at the time of filing, and/or as developed/made known after the time of filing.

As used herein, the terms "electrical grid," "electrical energy generation system," "electrical energy generation grid," "energy generation grid," "grid," are used interchangeably to denote systems and sub-systems used to generate, control, and transmit electrical energy. These can include, but are not limited to, energy generation facilities, substations, reactive components, transmission systems, control units, storage components, and any other components used to generate, control, and transmit electrical energy as discussed herein, and/or as known in the art at the time of filing, and/or as become available/known after the time of filing.

In addition, as used herein, the term "power system" can include, but is not limited to, any system or subsystem capable of transmitting and/or distributing power from one location to another location, as discussed herein, and/or as known/available in the art at the time of filing, and/or as developed/made available after the time of filing. Specific examples of "power systems" include, but not limited to, power distribution systems, power transmission systems, Alternating Current (AC) systems and/or sub-systems, and/or Direct Current (DC) systems and/or sub-systems.

As used herein the term "lines" or "line" as in "monitoring line," "signal line," etc. are used to represent any system or mechanism capable of gathering data, sending data, monitoring data sensing a value or parameter at a location, changing a value or parameter at a location, and/or operatively coupling two or more points or locations. In contrast, as used herein the terms "transmission lines" or "transmission line" are used to include various mechanisms used to transmit power.

More particularly, herein, the terms "line" and "lines," as used for example in the terms "output monitoring lines," "POU monitoring lines," and "control signal lines" include, but are not limited to, any mechanism for transferring data from one point to another point. As specific examples, herein the terms "line" and "lines" can be used to include any wired and/or wireless data transmission or transfer system capable of transferring data or information from one point to another point as discussed herein, and/or as known/available in the art at the time of filing, and/or as developed/made available after the time of filing.

In addition, as used herein, the term "data transfer system" as used for example in the terms "output monitoring data transfer system," "POU monitoring data transfer system," and "control signal data transfer system" include, but are not limited to, any mechanism for transferring data from one point to another point. As specific examples, herein the term "data transfer system" can be used to include any wired and/or wireless data transmission system capable of transmitting data or information from one point to another point as discussed herein, and/or as known/available in the art at the time of filing, and/or as developed/made available after the time of filing.

As used herein the term "energy generation facility output data" includes, but is not limited to, output data from an individual energy generation facility and/or any component, or set of components, of an energy generation facility and/or output data from one or more individual energy generation facilities, and/or any component, or set of components, of one or more individual energy generation facilities. As one specific example, energy generation facility output data can include data from one or more energy generation sources, such as one or more wind turbines, solar panels, etc.

System

In one embodiment, the disclosed methods and systems for controlling voltage and reactive power for electrical grids include a Master Grid Controller (MGC).

In one embodiment, the MGC measures the outputs of the energy generation facilities under its control at the Point Of Interconnection (POI) of each energy generation facility to a power system of an electrical grid. In addition, in one embodiment, the disclosed MGC measures the voltage at a POU to determine when the output voltage of the energy generation facilities must be adjusted to maintain voltage at a POU and thereby provide electrical grid stability.

In one embodiment, when the disclosed MGC determines that voltage at the POU is outside of the desired band, it adjusts the voltage control set points of all controlled energy generation facilities in a manner appropriate to bring the voltage at the POU into the desired voltage band.

In addition, in one embodiment, the disclosed MGC compares the output of the energy generation facilities to identify locations where reactive power is being exchanged and adjusts their outputs to limit that reactive power exchange and to share the production of reactive power across all the energy generation facilities under the MGCs control.

In contrast to prior art master control systems that controlled to reactive power, in one embodiment, the energy generation facilities remain in voltage control mode and the disclosed MGC adjusts their voltage set points up or down in predetermined discrete steps. Since, using the disclosed embodiments, the energy generation facilities are controlled to voltage rather than reactive power, the energy generation facilities can operate in voltage control mode to maintain the voltage at their point of interconnection.

In addition, in one embodiment, reactive power is monitored, controlled and balanced so that using the disclosed embodiments, the energy generation facilities are not only controlled to voltage but can operate in voltage droop mode without significant exchanges of reactive power.

Consequently, in one embodiment, the methods and systems for controlling voltage and reactive power for electrical grids disclosed herein allow the individual energy generation facilities to operate in voltage control mode and use the disclosed MGC to adjust voltage set points of the energy generation facilities up or down in predetermined discrete steps. This allows the energy generation facilities to be flexibly adjusted and controlled when needed while, at the same time, leaving them able to respond to electrical grid disturbances using the advantages of voltage control mode operation.

In addition, and in contrast to prior art "multi-master" systems, the disclosed methods and systems utilize a dedicated MGC that is separate and distinct from any of the controls units of any of the energy generation facilities under the control of the disclosed MGC. Therefore, using the disclosed methods and systems, the complications and inefficiencies of prior art "multi-master" systems is avoided.

Consequently, embodiments of the present disclosure provide a solution to the long-standing technical problem of effectively and efficiently controlling power system voltages and reactive power production to accommodate renewable energy source-based energy generation facilities and the resulting potentially weaker electrical grids as well as electrical grids with energy generation facilities that are separated by large physical distances.

In one embodiment, an electrical grid is disclosed that includes, but is not limited to, two or more energy generation facilities, a power system, points of interconnection (POIs) for each of the two or more energy generation facilities to the power system, at least one Point Of Utilization (POU), a Master Grid Controller (MGC), various data monitoring systems for collecting energy generation facility output data from each of the two or more energy generation facilities at their respective POIs, and various control signal transmission systems for relaying control signals to the two or more energy generation facilities.

In one embodiment, the two or more energy generation facilities can be any one or more of, including various combinations of, renewable energy source-based energy generation facilities, such as wind farms, solar farms, hydroelectric, or any other renewable energy source-based energy generation facilities, as discussed herein, and/or as known in the art at the time of filing, and/or as developed/made known after the time of filing; traditional fossil fuel-based energy generation facilities, as discussed herein, and/or as known in the art at the time of filing, and/or as developed/made known after the time of filing; nuclear-based energy generation facilities, as discussed herein, and/or as known in the art at the time of filing, and/or as developed/made known after the time of filing; electrical storage components such as battery banks, as discussed herein, and/or as known in the art at the time of filing, and/or as developed/made known after the time of filing; reactive power energy generation facilities such as inductor banks/reactors, capacitors, STATCOMs, or any other reactive power energy generation facilities/components, as discussed herein, and/or as known in the art at the time of filing, and/or as developed/made known after the time of filing; sub-stations; switching stations; or any other energy generation facilities as discussed herein, and/or as known in the art at the time of filing, and/or as developed/made known after the time of filing.

In one embodiment, each of the two or more energy generation facilities has an energy generation source, such as wind driven turbines for converting kinetic wind energy into electrical energy, solar panels for converting solar radiation energy into electrical energy, hydro-turbines for converting kinetic water energy into electrical energy, nuclear reactors for converting controlled nuclear reactions into heat energy to heat steam to drive steam turbines for generating electrical energy, fossil fuel generators for converting chemical energy into electrical energy, and/or any other energy generation sources used to generate electrical energy as discussed herein, and/or as known in the art at the time of filing, and/or as developed/made known after the time of filing.

In one embodiment, each of the two or more energy generation facilities includes a control unit for controlling various parameters of their respective energy generation sources to provide a desired electrical energy output. In one embodiment, each of the two or more energy generation facilities provides an electrical energy output at an output terminal "out."

In one embodiment, each of the two or more energy generation facilities provides the generated electrical energy at its output terminal to a POI of that energy generation facility to the power system. In various embodiments, the power system is a collection of power distribution and transmission mechanisms, such as transmission lines, interconnecting the two or more energy generation facilities and providing for the distribution and/or transmission of the combined electrical energy produced at the two or more energy generation facilities to various locations such as POUs, substations, switching stations, communities and facilities consuming the electrical energy, other power systems and/or other electrical grids, and/or any other destinations or sub-destinations for the generated electrical energy, as discussed herein, and/or as known in the art at the time of filing, and/or as developed/made known after the time of filing.

As noted above, as used herein, the term "power system" can include, but is not limited to, any system or subsystem capable of transmitting and/or distributing power from one location to another location, as discussed herein, and/or as known/available in the art at the time of filing, and/or as developed/made available after the time of filing. Specific examples of "power systems" include, but not limited to, power distribution systems, power transmission systems, Alternating Current (AC) systems and/or sub-systems, and/or Direct Current (DC) systems and/or sub-systems.

In one embodiment, at least one POU can be a point at a sub-component of the electrical grid, such as a substation or switching station, or any other point of the electrical grid desired, as discussed herein, and/or as known in the art, and/or as developed after the time of filing. In some embodiments, at least one POU is separate and distinct, and/or physically removed, from any POI of any of the two or more energy generation facilities. In other embodiments, at least one POU may be a POI for one or more energy generation facilities.

In one embodiment, the disclosed MGC measures the outputs of the energy generation facilities under its control at the POI of each energy generation facility to the power system of the electrical grid. In addition, the disclosed MGC measures the voltage at a POU to determine when the output of the energy generation facilities must be adjusted to maintain voltage at the POU and thereby provide electrical grid stability.

In one embodiment, the MGC includes a data collection module for collecting energy generation facility output data from each of the two of more energy generation facilities at their respective points of interconnection. To this end, the various output monitoring data transfer systems for collecting output data from each of the two or more energy generation facilities at their respective POIs are in communication with the MGC data collection module and the POIs of each of the energy generation facility.

In various embodiments, output monitoring data transfer systems can include wired or wireless data transfer systems including, but not limited to hard-wired data lines, wireless microwave data transmission systems, optical data transmission systems, Bluetooth systems, and/or any data transmission system capable of obtaining, transmitting, and/or receiving information as discussed herein, and/or as known or available in the art at the time of filing, and/or as becomes known or available after the time of filing.

In one embodiment, the data collection module of the disclosed MGC collects energy generation facility output data from each energy generation facility connected to the power systems of an electrical grid at the point of interconnection. In various embodiments, the output data from each energy generation facility includes, but is not limited to, real power, reactive power, voltage, breaker status, and/or any other energy generation facility output data relevant to MGC operation, as discussed herein, and/or as known in the art at the time of filing, and/or as becomes known/available after the time of filing.

In one embodiment, the MGC data collection module also collects POU data from at least one POU. To this end, the MGC data collection module is also in communication with at least one POU via a POU monitoring data transfer system that can be one of the various output monitoring data transfer systems.

In various embodiments, the POU monitoring data transfer system can include wired or wireless data transfer systems including, but not limited to hard-wired data lines, wireless microwave data transmission systems, optical data transmission systems, Bluetooth systems, and/or any data transmission system capable of obtaining, transmitting, and/or receiving information as discussed herein, and/or as known or available in the art at the time of filing, and/or as becomes known or available after the time of filing.

In various embodiments, the POU data includes, but is not limited to, real power, reactive power, voltage, breaker status, and/or any other POU data relevant to MGC operation, as discussed herein, and/or as known in the art at the time of filing, and/or as becomes known/available after the time of filing.

In one embodiment, the primary source of energy generation facility output data and POU data for the MGC data collection module are the Remote Terminal Units (RTUs) of each energy generation facility and the POU host subsystem, e.g., the RTU of the substation hosting the MGC.

In some embodiments, meters, relays, control units, and any other energy generation facility output data sources discussed herein, and/or as known in the art at the time of filing, and/or as developed after the time of filing are sources of energy generation facility output data and POU data for the MGC data collection module.

In one embodiment, when the disclosed MGC determines that voltage at the POU is outside of the desired band, it adjusts the voltage control set points of all controlled energy generation facilities in a manner appropriate to bring the voltage at the POU into the desired band. Simultaneously, the disclosed MGC compares the output of the energy generation facilities to identify locations where reactive power is being exchanged and adjusts their outputs to limit that reactive power exchange and/or share reactive power production across the energy generation facilities.

To this end, in one embodiment, the MGC includes a data analysis module, including at least one processor and at least one memory unit. In one embodiment, the output data from each energy generation facility and the POU data are provided to the MGC data analysis module. In one embodiment, at the MGC data analysis module the voltage at the POU is monitored to ensure the voltage at the POU is within a defined/desired voltage band. If the MGC data analysis module determines the voltage at the POU is outside the defined/desired voltage band, the MGC data analysis module generates control signals to be sent to each energy generation facility to adjust the output voltages of each energy generation facility at their respective POIs. In one embodiment, the control signals are used to adjust the voltage control set points of all controlled energy generation facilities in a manner appropriate to bring the voltage at the POU into the desired band.

In one embodiment, the MGC data analysis module also analyzes the output data from each energy generation facility to identify locations where reactive power is being exchanged between energy generation facilities. If a determination is made by the MGC data analysis module that reactive power is being exchanged between energy generation facilities, the MGC data analysis module generates control signals to be sent to energy generation facilities to reduce the exchanged power. In one embodiment, the MGC data analysis module generates control signals to be sent to energy generation facilities to spread the production of reactive power evenly across the energy generation facilities based on the maximum capabilities of each of energy generation facilities; in one embodiment as a common percentage of the maximum capabilities of each of energy generation facilities.

In one embodiment, the control signals generated by the MGC data analysis module are provided to an MGC control signal transmission module. The control signals are then transmitted from the MGC control signal transfer module to the energy generation facilities using the various control signal data transfer systems for relaying control signals to the two or more energy generation facilities. Consequently, in one embodiment, the various control signal systems are in communication with both the MGC control signal transfer module and the two or more energy generation facilities.

In various embodiments, control signal data transfer systems can include wired or wireless data transfer systems including, but not limited to hard-wired data lines, wireless microwave data transmission systems, optical data transmission systems, Bluetooth systems, and/or any data transmission system capable of obtaining, transmitting, and/or receiving information as discussed herein, and/or as known or available in the art at the time of filing, and/or as becomes known or available after the time of filing.

In one embodiment, the various control signal data transfer systems are in communication with the respective control units of the two or more energy generation facilities. In other embodiments, the various control signal data transfer systems are in communication with respective RTUs of the two or more energy generation facilities which, in turn, are in communication with the respective control units of the two or more energy generation facilities. In various embodiments, the control signals are then used by the control units of the two or more energy generation facilities to adjust the energy generation sources to provide the desired voltage output at the respective output terminals, and POI, of the two or more energy generation facilities.

In one embodiment, data from the MGC, e.g., any or all of the MGC data is stored and made available for analysis. Consequently, the MGC data can be remotely accessed and used for efficiency evaluation, forensic purposes, and/or for any purpose desired.

In one embodiment, the disclosed MGC is monitored and controlled via a Human Machine Interface (HMI) and/or through a remote SCADA connection to an Energy Management System (EMS). In one embodiment, the HMI is hosted on HMI software included in the MGC and the various MGC data is accessible via a DNP3 connection.

In contrast to prior art master control systems that controlled to reactive power, in one embodiment, the energy generation facilities remain in voltage control mode and the disclosed MGC adjusts their voltage set points up or down in predetermined discrete steps. Since, using the disclosed embodiments, the energy generation facilities are controlled to voltage rather than reactive power, the energy generation facilities can operate in voltage control mode to maintain the voltage at their point of interconnection.

In addition, in one embodiment, reactive power is monitored, controlled and balanced so that using the disclosed embodiments, the energy generation facilities are not only controlled to voltage but can operate in voltage droop mode without significant exchanges of reactive power.

Consequently, the electrical grids using the disclosed MGC are provided the control of the prior master control units while also receiving the rapid reaction time benefits of energy generation facilities operating in voltage control mode with voltage droop. This allows the reactive power output of the energy generation facilities to be adjusted flexibly and precisely when needed while, at the same time, leaving them able to quickly respond to and "ride through" electrical grid disturbances.

The additional supervision of reactive power exchange between energy generation facilities of some embodiments also allows the disclosed MGC to control energy generation facilities spread out over a large geographic area while maintaining control at a single, central location, i.e., at the POU.

One embodiment of the disclosed MGC includes the ability to log all measured data, calculations, and operations on a continuous basis. This allows for the downloading of the MGC log data for review as needed and for providing unique data to determine operational set points and verify proper functionality.

In one embodiment, the disclosed MGC utilizes any number of data sources, reactive power devices, and operational rules. Again, unlike prior art master control systems that measured existing reactive power and calculated desired reactive power changes in order to control voltage output, the disclosed MGC instead adjusts energy generation facility output voltage up or down and controls to voltage. Therefore, the disclosed MGC allows for more stable control over a wider area.

As discussed above, the disclosed MGC accommodates all types of energy generation facilities, in any combination, including renewable energy source-based energy generation facilities and any other energy generation facilities having fluctuating and unpredictable outputs. Consequently, the disclosed MGC is well suited to potentially weaker electrical grids.

In addition, in one embodiment, as discussed above, when the disclosed MGC determines one or more energy generation facilities may be exchanging reactive power the MGC adjusts the voltage set points of the energy generation facilities to reduce the exchanged power. Consequently, using the disclosed MGC the increased losses, reduced equipment capacity, and other problems associated with the excessive exchange of reactive power that does not contribute to the overall power generation of the energy generation facilities is avoided.

In addition, the disclosed MGC can be customized for a wide variety of installations and can therefore be applied to a wide variety of projects and numerous electrical grid configurations.

In addition, in contrast to prior "multi-master" systems discussed above, the disclosed methods and systems utilize a dedicated MGC that is separate and distinct from any of the respective control units of the two or more energy generation facilities. Therefore, using the disclosed methods and systems, the complications and inefficiencies of prior art "multi-master" systems is avoided.

For these and numerous other reasons discussed herein, the disclosed MGC, and any electrical grid utilizing the disclosed MGC, represents a significant improvement over the prior art methods and systems.

Therefore, the embodiments of the present disclosure provide a solution to the long-standing technical problem of effectively and efficiently controlling power system voltages and reactive power productions to accommodate renewable energy source-based energy generation facilities and the resulting potentially weaker electrical grids.

Figure 2:
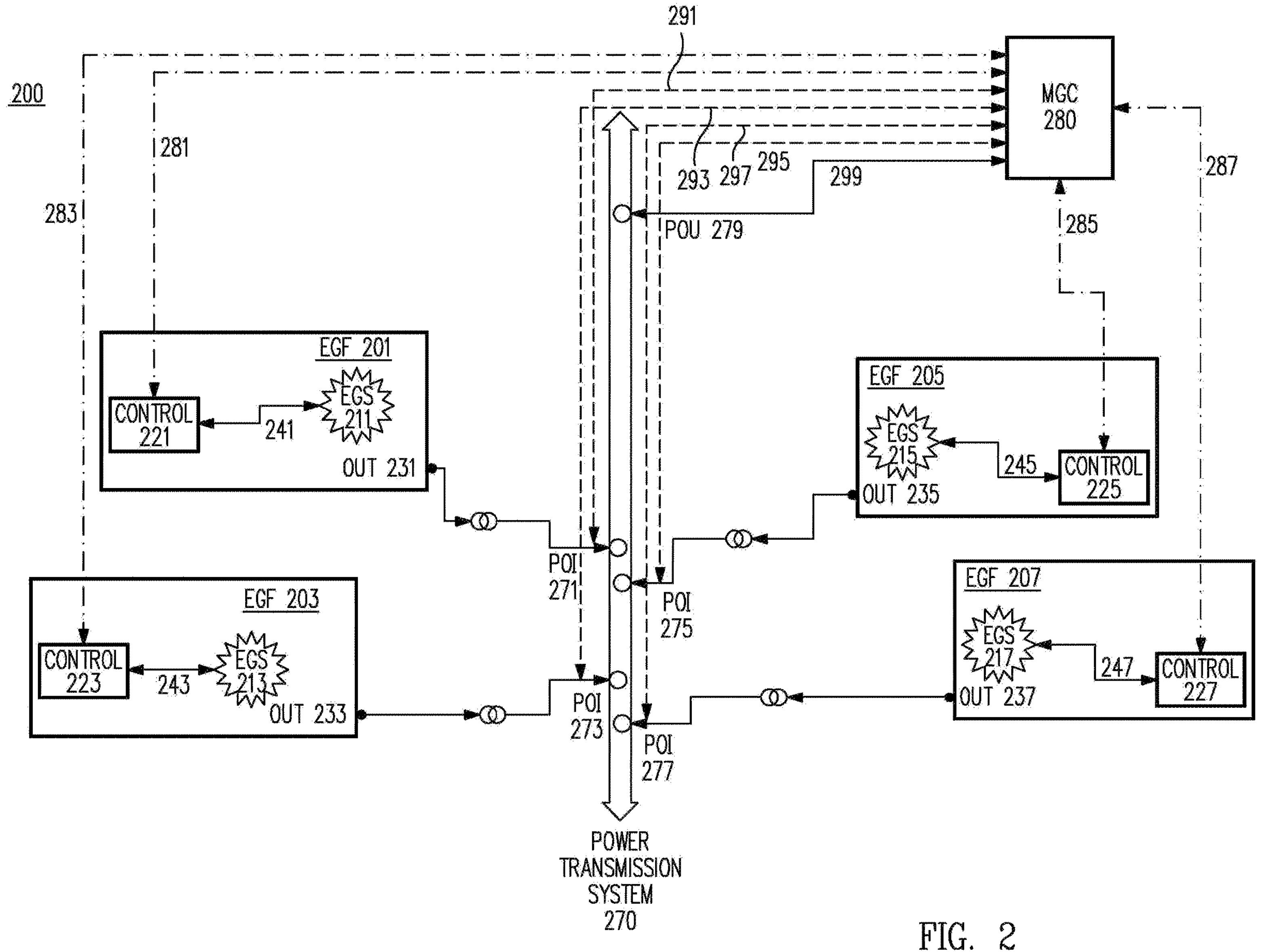
FIG. 2 is a simplified block diagram of one embodiment of an electrical grid 200 utilizing one embodiment of the disclosed Master Grid Controller (MGC) in accordance with one embodiment.

FIG. 2 is a simplified block diagram of one illustrative example of an electrical grid 200 utilizing one embodiment of the disclosed Master Grid Controller (MGC) 280 in accordance with one embodiment.

As seen in FIG. 2, electrical grid 200 includes, but is not limited to: energy generation facilities 201, 203, 205, and 207; a simplified representation of a power system 270; Points Of Interconnection (POIs) 271, 273, 275, and 277 for each of the energy generation facilities 201, 203, 205, and 207, respectively, to the power system 270; POU 279; an MGC 280; data collection/monitoring data transfer systems 291, 293, 295, and 297, for collecting energy generation facility output data from each of the energy generation facilities 201, 203, 205, and 207 at their respective POIs 271, 273, 275, and 277; POU monitoring data transfer system 299 for collecting POU data; and various control signal data transfer systems 281, 283, 285, and 287, for relaying control signals from MGC 280 to energy generation facilities 201, 203, 205, and 207, respectfully.

Although in the FIGS. herein the data collection/monitoring data transfer systems, such as data collection/monitoring data transfer systems 291, 293, 295, and 297, and/or POU monitoring data transfer system 299, and/or control signal data transfer systems 281, 283, 285, and 287 are shown for simplicity as lines, as noted above, in various embodiments, any of data collection/monitoring data transfer systems 291, 293, 295, and 297, and/or POU monitoring data transfer system 299, and/or control signal data transfer systems 281, 283, 285, and 287 can include wired or wireless data transfer systems including, but not limited to hard-wired data lines, wireless microwave data transmission systems, optical data transmission systems, Bluetooth systems and/or any data transmission system capable of obtaining, transmitting, and/or receiving information as discussed herein, and/or as known or available in the art at the time of filing, and/or as becomes known or available after the time of filing.

In the discussion with respect to FIG. 2 and the one illustrative example of an electrical grid 200 utilizing one embodiment of the disclosed MGC 280, four energy generation facilities 201, 203, 205, and 207 are described. However, those of skill in the art will readily understand that any number of energy generation facilities could be used with the disclosed electrical grids utilizing the disclosed MGCs. Consequently, the electrical grid 200 utilizing one embodiment of the disclosed MGC 280 shown in FIG. 2, including four energy generation facilities 201, 203, 205, and 207, is an illustrative example only and in no way limits the scope of the invention set forth in the claims below.

In addition, those of skill in the art will recognize that the electrical grid 200 utilizing one embodiment of the disclosed MGC 280 shown in FIG. 2 is highly simplified for illustration of key features and components. Actual electrical grids utilizing the disclosed MGC can have numerous additional components and features including, but not limited to, reactive components, storage components, control components, substations, switching stations, and/or any other components discussed herein, known in the art at the time of filing, and/or that become known after the time of filing, that can be used with electrical grids. These components and features are not shown in the electrical grid 200 utilizing one embodiment of the disclosed MGC 280 shown in FIG. 2, nor discussed herein, for simplicity and to avoid detracting from the basic structure and systems being illustrated and disclosed. Consequently, the electrical grid 200 utilizing one embodiment of the disclosed MGC 280 shown in FIG. 2 is an illustrative example only and in no way limits the scope of the invention set forth in the claims below.

In one embodiment, energy generation facilities 201, 203, 205, and 207 can be any one or more of, including various combinations of, renewable energy source-based energy generation facilities, such as wind farms, solar farms, hydroelectric, or any other renewable energy source-based energy generation facilities, as discussed herein, and/or as known in the art at the time of filing, and/or as developed/made known after the time of filing; traditional fossil fuel-based energy generation facilities, as discussed herein, and/or as known in the art at the time of filing, and/or as developed/made known after the time of filing; nuclear-based energy generation facilities, as discussed herein, and/or as known in the art at the time of filing, and/or as developed/made known after the time of filing; electrical storage components such as battery banks, as discussed herein, and/or as known in the art at the time of filing, and/or as developed/made known after the time of filing; reactive power energy generation facilities such as inductor banks/reactors, capacitors, STATCOMs, or any other reactive power energy generation facilities generation facilities, as discussed herein, and/or as known in the art at the time of filing, and/or as developed/made known after the time of filing; sub-stations; switching stations; or any other energy generation facilities as discussed herein, and/or as known in the art at the time of filing, and/or as developed/made known after the time of filing.

In one embodiment, each of energy generation facilities 201, 203, 205, and 207 has an energy generation source 211, 213, 215, and 217, respectively, such as wind driven turbines for converting kinetic wind energy into electrical energy, solar panels for converting solar radiation energy into electrical energy, hydro-turbines for converting kinetic water energy into electrical energy, nuclear reactors for converting controlled nuclear reactions into heat energy to heat steam to drive steam turbines for generating electrical energy, fossil fuel generators for converting chemical energy into electrical energy, and/or any other energy generation sources used to generate electrical energy as discussed herein, and/or as known in the art at the time of filing, and/or as developed/made known after the time of filing.

In one embodiment, each of energy generation facilities 201, 203, 205, and 207 includes a control unit 221, 223, 225, and 227, respectively, for controlling various parameters of their respective energy generation sources 211, 213, 215, and 217 to provide a desired electrical energy output. As seen in FIG. 2, control units 221, 223, 225, and 227 are coupled to energy generation sources 211, 213, 215, and 217 by control signal data transfer systems 241, 243, 245, and 247, respectively. In one embodiment, each of the energy generation facilities 201, 203, 205, and 207 provide an electrical energy output at a respective output terminal 231, 233, 235, and 237.

Of note is the fact that, in contrast to prior art “multi-master” systems, the disclosed methods and systems utilize a dedicated MGC 280 that is separate and distinct from any of the control units 221, 223, 225, and 227, for controlling various parameters of their respective energy generation sources 211, 213, 215, and 217. Therefore, using the disclosed methods and systems, the complications and inefficiencies of prior art “multi-master” systems is avoided.

The operation and structure of various types of energy generation facilities, such as energy generation facilities 201, 203, 205, and 207; control units, such as control units 221, 223, 225, and 227; and output terminals, such as output terminals 231, 233, 235, and 237 are well known in the art and include any energy generation facilities, control units, and output terminals discussed herein, and/or as known in the art at the time of filing, and/or as developed/made available after the time of filing. Consequently, a more detailed discussion of the general structure and operation of energy generation facilities 201, 203, 205, and 207; control units 221, 223, 225, and 227; and output terminals 231, 233, 235, and 237 is omitted here to avoid detracting from the disclosure.

In one embodiment, each of energy generation facilities 201, 203, 205, and 207 provides the generated electrical energy at its respective output terminal 231, 233, 235, and 237 to its respective POI 271, 273, 275, and 277 of that energy generation facility to the power system 270.

In various embodiments, the power system 270 is a collection of power systems, such as power transmission and/or distribution lines (not shown in FIG. 2, but shown in simplified form in FIG. 4) interconnecting the energy generation facilities 201, 203, 205, and 207 and providing for the transmission of the combined electrical energy produced at the energy generation facilities 201, 203, 205, and 207 to various locations such as the POU 279; substations/subcomponents; communities and facilities consuming the electrical energy; other power systems; other electrical grids; and/or any other destinations or sub-destinations for the generated electrical energy, as discussed herein, and/or as known in the art at the time of filing, and/or as developed/made known after the time of filing.

In one embodiment, the POU 279 can be a point at a sub-component or host facility (not shown in FIG. 2 but shown in simplified form in FIGS. 3 and 4) of the electrical grid 200 such as a substation or switching station, or any other point of the electrical grid 200 desired, as discussed herein, and/or as known in the art, and/or as developed after the time of filing. In some embodiments, the POU 279 is separate and distinct, and/or physically removed, from any POI 271, 273, 275, and 277 of any of energy generation facilities 201, 203, 205, and 207. In other embodiments, such as electrical grids 300 and 400 of FIGS. 3 and 4, the POU may be a POI for one or more energy generation facilities 201, 203, 205, and 207.

In one embodiment, the disclosed MGC 280 measures the outputs 231, 233, 235, and 237 of the energy generation facilities 201, 203, 205, and 207, respectively, at the POIs 271, 273, 275, and 277, of each energy generation facility 201, 203, 205, and 207, respectively, to the power system 270 of the electrical grid 200.

In addition, in one embodiment, the disclosed MGC 280 measures the voltage at the POU 279 to determine when the output of the energy generation facilities 201, 203, 205, and 207 must be adjusted to maintain voltage at POU 279 and thereby provide electrical grid 200 voltage stability.

Figure 5:
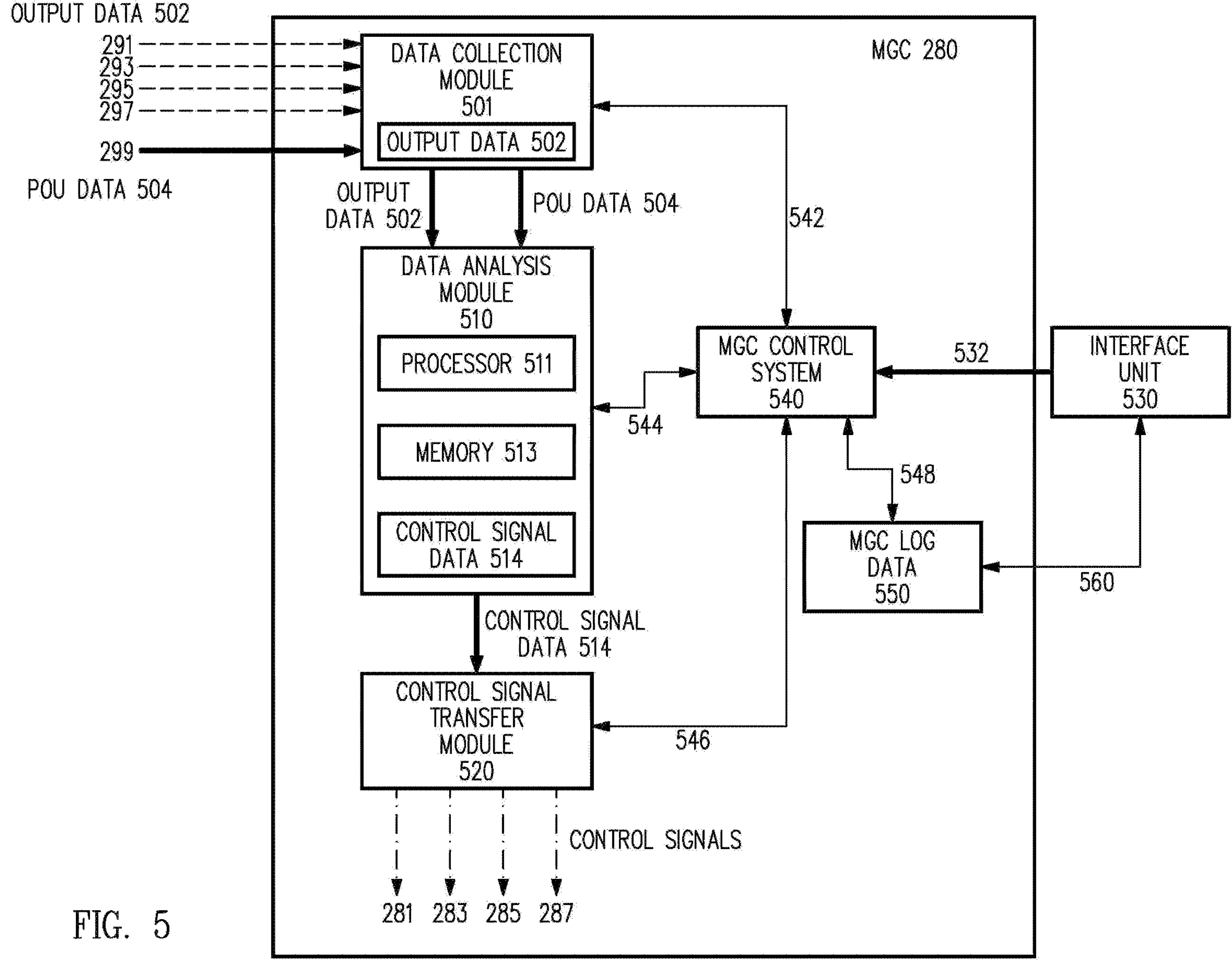
FIG. 5 is a functional block diagram of various illustrative components of a Master Grid Controller (MGC) in accordance with one embodiment.

FIG. 5 shows a simplified block diagram of one illustrative embodiment of a disclosed MGC, such as MGC 280. Referring to FIGS. 2 and 5 together, in one embodiment, MGC 280 includes a data collection module 501 for collecting energy generation facility output data 502 from each of the energy generation facilities 201, 203, 205, and 207 at their respective POIs 271, 273, 275, and 277. To this end, the data collection/monitoring data transfer systems 291, 293, 295, and 297 for collecting output data 502 from each of the energy generation facilities 201, 203, 205, and 207 at their respective POIs 271, 273, 275, and 277 are in communication with the MGC data collection module 501 and the POIs 271, 273, 275, and 277 of each of the energy generation facilities 201, 203, 205, and 207.

In one embodiment, the MGC data collection module 501 of the disclosed MGC 280 collects energy generation facility output data 502 that includes, but is not limited to, the following data from each energy generation facility: real power; reactive power; voltage; breaker status; and/or any other energy generation facility output data relevant to MGC 280 operation, as discussed herein, and/or as known in the art at the time of filing, and/or as becomes known/available after the time of filing.

In one embodiment, the MGC data collection module 501 also collects POU data 504 from POU 279. To this end, the MGC data collection module 501 is also in communication with the POU 279 via POU monitoring data transfer system 299. In various embodiments, the POU data 504 includes but is not limited to, real power, reactive power, voltage, breaker status, and/or any other POU data relevant to MGC 280 operation, as discussed herein, and/or as known in the art at the time of filing, and/or as becomes known/available after the time of filing.

Figure 3:
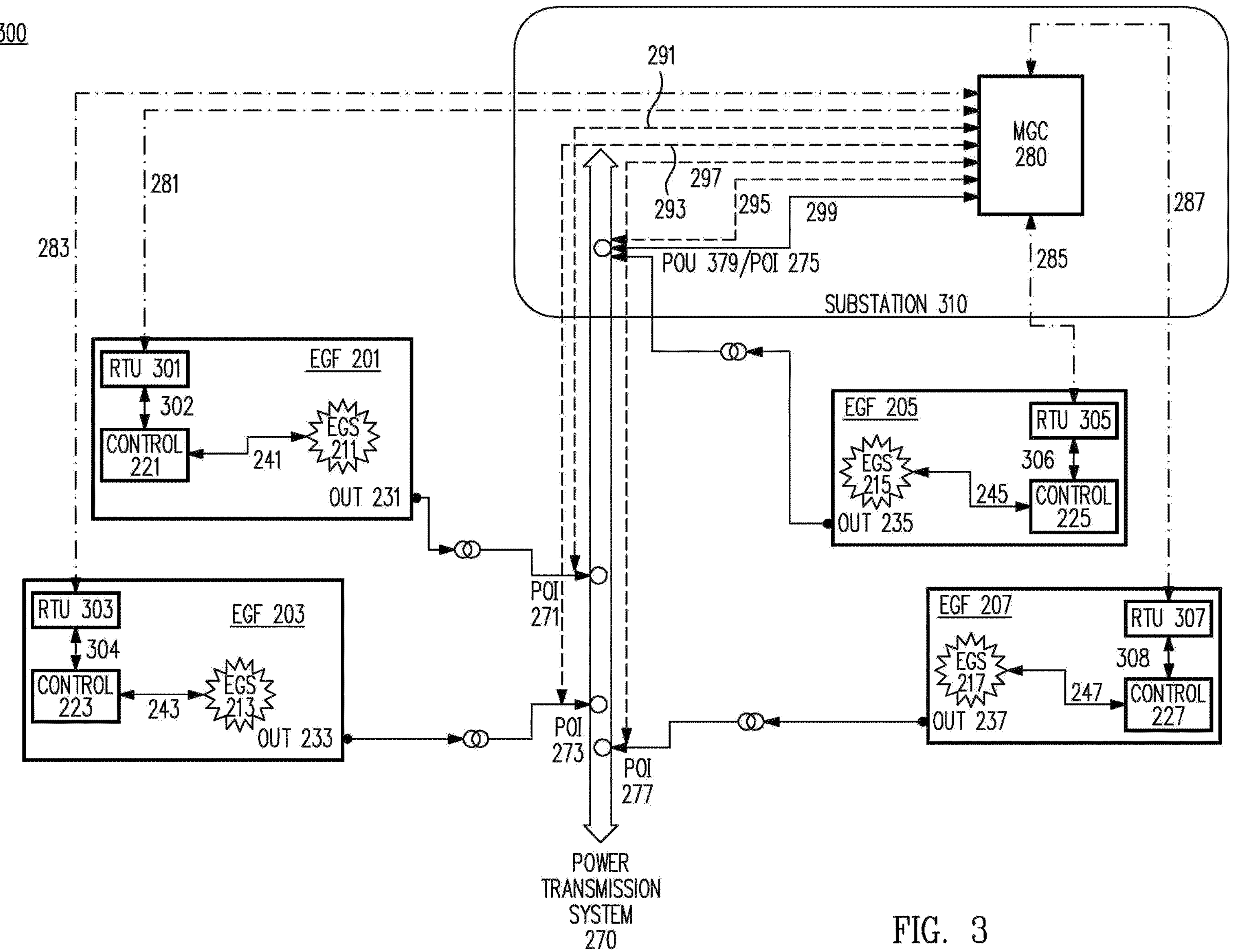
FIG. 3 is a simplified block diagram of one embodiment of an electrical grid 300 utilizing one embodiment of the disclosed Master Grid Controller (MGC) being hosted by a sub-station and Remote Terminal Units (RTUs) at each of the energy generation facilities in accordance with one embodiment.
Figure 4:
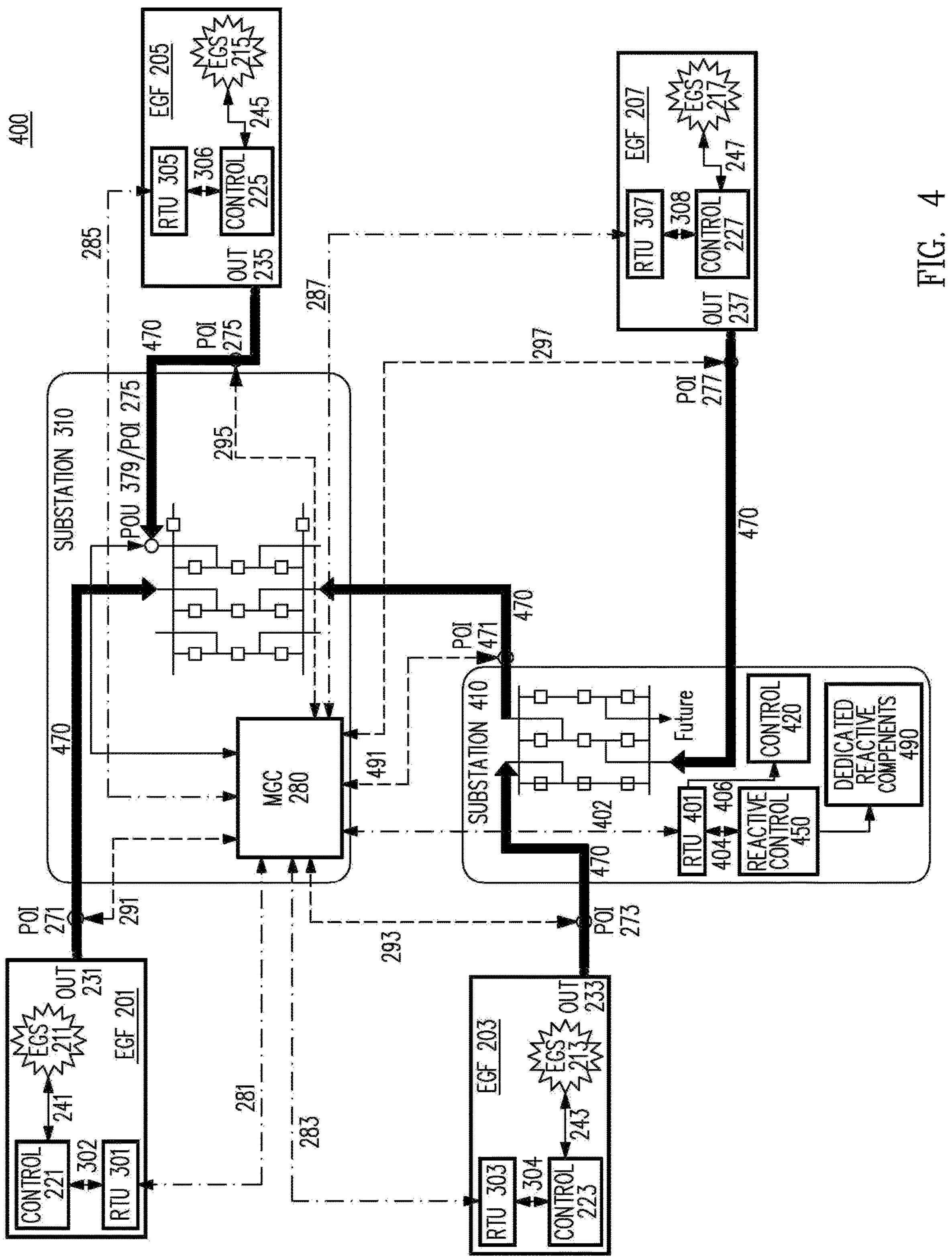
FIG. 4 is a simplified block diagram of one embodiment of an electrical grid 400 utilizing one embodiment of the disclosed Master Grid Controller (MGC) being hosted by a sub-station and including a second sub-station and Remote Terminal Units (RTUs) at each of the energy generation facilities and the second sub-station in accordance with one embodiment.

In one embodiment, the primary source of energy generation facility output data 502 and POU data 504 for the MGC data collection module 501 are the Remote Terminal Units (RTUs) of each energy generation facility 201, 203, 205, and 207 (not shown in FIG. 2 but shown in FIGS. 3 and 4) and the POU host sub-system, e.g., the substation hosting MGC 280 (not shown in FIG. 2 but shown in FIGS. 3 and 4).

In some embodiments, meters, relays, control units, and any other energy generation facility output data sources discussed herein, and/or as known in the art at the time of filing, and/or as developed after the time of filing are sources of energy generation facility output data 502 and POU data 504 data for the MGC 280 data collection module.

As discussed in more detail below, in one embodiment, when the disclosed MGC 280 determines that voltage at the POU 279 is outside of the desired voltage band, it adjusts the voltage control set points of all controlled energy generation facility 201, 203, 205, and 207 in a manner appropriate to bring the voltage at the POU 279 back into the desired band.

In addition, in one embodiment, the disclosed MGC 280 simultaneously compares the energy generation facility output data 502 of the energy generation facilities 201, 203, 205, and 207 at their respective POIs 271, 273, 275, and 277 to identify locations where reactive power is being exchanged and adjusts the energy generation facilities 201, 203, 205, and 207 outputs to limit that reactive power exchange. In one embodiment, the disclosed MGC 280 adjusts the energy generation facilities 201, 203, 205, and 207 outputs to share the reactive power production evenly across the energy generation facilities 201, 203, 205, and 207; in one embodiment, as a common percentage of the maximum reactive power capabilities of each of the energy generation facilities 201, 203, 205, and 207.

To this end, in one embodiment, MGC 280 includes a data analysis module 510, including at least one processor 511 and at least one memory 513. In one embodiment, the output data 502 from each energy generation facility 201, 203, 205, and 207 and the POU data 504 are provided to the MGC data analysis module 510 from MGC data collection module 501. In one embodiment, at the MGC data analysis module 510, the voltage at the POU 279 is monitored to ensure the voltage at the POU 279 is within a defined/desired voltage band. If the MGC data analysis module 510 determines the voltage at the POU 279 is outside the defined/desired voltage band, the MGC data analysis module 510 generates control signal data 514 to be sent to each energy generation facility 201, 203, 205, and 207 as control signals via control signal transfer module 520 and control signal data transfer systems 281, 283, 285, and 287, respectively.

In one embodiment, the control signals represented by, and included in, control signal data 514 are used to control the energy generation facilities 201, 203, 205, and 207 to voltage by adjusting the voltage control set points of all controlled energy generation facilities 201, 203, 205, and 207 in a manner appropriate to bring the voltage at the POU 279 into the desired band.

In one embodiment, the MGC data analysis module 510 also analyzes the energy generation facility output data 502 from each energy generation facility 201, 203, 205, and 207 at their respective POIs 271, 273, 275, and 277 to identify locations where reactive power is being exchanged between two or more energy generation facilities 201, 203, 205, and 207. In one embodiment, if a determination is made by the MGC data analysis module 510 that reactive power is being exchanged between two or more energy generation facilities 201, 203, 205, and 207, the MGC data analysis module 510 generates control signals in the form of control signal data 514 to adjust the voltage set points of the energy generation facilities 201, 203, 205, and 207 involved to reduce the exchanged power. In one embodiment, the control signals in the form of control signal data 514 adjust each of the energy generation facility 201, 203, 205, and 207 outputs to share the reactive power production evenly across the energy generation facilities 201, 203, 205, and 207; in one embodiment, as a common percentage of the maximum reactive power capabilities of each of the energy generation facilities 201, 203, 205, and 207.

In one embodiment, the control signals represented in control signal data 514 generated by the MGC data analysis module 510 are provided to MGC control signal transfer module 520. The control signals represented in control signal data 514 are then transmitted from the MGC control signal transfer module 520 to the energy generation facilities 201, 203, 205, and 207, using control signal data transfer systems 281, 283, 285, and 287, respectively, for relaying control signals to the energy generation facilities 201, 203, 205, and 207. Consequently, the control signal data transfer systems 281, 283, 285, and 287 are in communication with both the MGC control signal transfer module 520 and the energy generation facilities 201, 203, 205, and 207.

As noted above, although in the FIGS. herein the data collection/monitoring data transfer systems, such as data collection/monitoring data transfer systems 291, 293, 295, and 297, and/or POU monitoring data transfer system 299, and/or control signal data transfer systems 281, 283, 285, and 287 are shown for simplicity as lines, as noted above, in various embodiments, any of data collection/monitoring data transfer systems 291, 293, 295, and 297, and/or POU monitoring data transfer system 299, and/or control signal data transfer systems 281, 283, 285, and 287 can include wired or wireless data transfer systems including, but not limited to hard-wired data lines, wireless microwave data transmission systems, optical data transmission systems, Bluetooth systems and/or any data transmission system capable of obtaining, transmitting, and/or receiving information as discussed herein, and/or as known or available in the art at the time of filing, and/or as becomes known or available after the time of filing.

In one embodiment, control signal data transfer systems 281, 283, 285, and 287 are in communication with the respective control units 221, 223, 225, and 227 of the energy generation facilities 201, 203, 205, and 207.

In other embodiments, control signal data transfer systems 281, 283, 285, and 287 are in communication with respective RTUs (not shown in FIG. 2 but shown in FIGS. 3 and 4) of the energy generation facilities 201, 203, 205, and 207 which, in turn, are in communication with the respective control units 221, 223, 225, and 227 of energy generation facilities 201, 203, 205, and 207.

In various embodiments, control signals represented in control signal data 514 are then used by the control units 221, 223, 225, and 227 of the respective energy generation facilities 201, 203, 205, and 207 to adjust the energy generation sources 211, 213, 215, and 217, respectively, to provide the desired voltage output at the respective output terminals 231, 233, 235, and 237, and POIs 271, 273, 275, and 277, of the energy generation facilities 201, 203, 205, and 207.

It is again important to point out that, in contrast to prior art "multi-master" systems, the disclosed methods and systems utilize a dedicated MGC 280 that is separate and distinct from any of the control units 221, 223, 225, and 227, for controlling various parameters of their respective energy generation sources 211, 213, 215, and 217. Therefore, using the disclosed methods and systems, the complications and inefficiencies of prior art "multi-master" systems is avoided.

In one embodiment, the disclosed MGC 280 is monitored/interfaced with via an interface unit 530 to an MGC control system 540 by way of data transfer system 532. In one embodiment, MGC control system 540 is coupled to MGC data collection module 501 through data transfer system 542; MGC analysis module through data transfer system 544, and MGC control signal transfer module 520 through data transfer system 546. In one embodiment, interface unit 530 is software included in MGC 280 (not shown) and the various MGC log data 550 is accessible via interface unit 530 and line 560.

Consequently, one embodiment of the disclosed MGC 280 includes the ability to log all measured data, calculations, and operations on a continuous basis as MGC log data 550 via data transfer system 548. This allows for the downloading of MGC log data 550 by Interface unit 530 via line 560 for review as needed and for providing unique MGC log data 550 to determine operational set points and verify proper functionality.

As noted above, in various embodiments, any of data transfer systems 532, 542, 544, 546, and 548 can include wired or wireless data transfer systems including, but not limited to hard-wired data lines, wireless microwave data transmission systems, optical data transmission systems, Bluetooth systems, and/or any data transmission system capable of obtaining, transmitting, and/or receiving information as discussed herein, and/or as known or available in the art at the time of filing, and/or as becomes known or available after the time of filing.

In contrast to prior art master control systems that controlled to reactive power, in one embodiment, using the disclosed the electrical grid 200, the energy generation facilities 201, 203, 205, and 207 remain in voltage control mode and the disclosed MGC 280 adjusts their voltage set points up or down in predetermined discrete steps. Since, using the disclosed embodiments, the energy generation facilities 201, 203, 205, and 207 are controlled to voltage rather than reactive power, the energy generation facilities can operate in voltage control mode to maintain the voltage at their point of interconnection.

In addition, in one embodiment, reactive power is monitored, controlled and balanced so that using the disclosed embodiments, the energy generation facilities 201, 203, 205, and 207 are not only controlled to voltage but can operate in voltage droop mode without significant exchanges of reactive power.

Consequently, electrical grid 200 and disclosed MGC 280 allow for the precise control and flexibility of the prior art master control systems, such as MVC systems, while also receiving the rapid reaction time benefits of energy generation facilities operating in voltage control mode. This allows the output of the energy generation facilities 201, 203, 205, and 207 to be adjusted flexibly and precisely when needed while, at the same time, leaving them able to quickly respond to electrical grid disturbances.

The additional supervision of reactive power exchange between energy generation facilities 201, 203, 205, and 207 also allows electrical grid 200 and disclosed MGC 280 to control energy generation facilities 201, 203, 205, and 207 spread out over a large geographic area while maintaining control at a single, central location, i.e., POU 279.

In one embodiment, the disclosed electrical grid 200 and disclosed MGC 280 utilizes any number of data sources desired, reactive power devices desired, and operational rules desired. Again, unlike prior art master control systems that measured existing reactive power and calculated desired reactive power changes in order to control voltage output, the electrical grid 200 and disclosed MGC 280 instead adjusts energy generation facility output voltage up or down to control to voltage. Therefore, the disclosed electrical grid 200 and disclosed MGC 280 allows for more stable control over a wider area.

FIG. 3 is a simplified block diagram of another embodiment of an electrical grid 300 utilizing one embodiment of the disclosed Master Grid Controller (MGC) being hosted by a substation and Remote Terminal Units (RTUs) at each of the energy generation facilities in accordance with one embodiment.

Electrical grid 300 of FIG. 3 is similar to electrical grid 200 of FIG. 2 and like elements are similarly labeled in FIGS. 2 and 3. Therefore the discussion above with respect to electrical grid 200 of FIG. 2 is incorporated in the below discussion of electrical grid 300 of FIG. 3 in its entirety.

Referring to both FIGS. 2 and 3, electrical grid 300 of FIG. 3 differs from electrical grid 200 of FIG. 2 in that electrical grid 300 of FIG. 3 shows MGC 280 located in substation 310 that is the host sub-system for MGC 280.

In addition, electrical grid 300 of FIG. 3 differs from electrical grid 200 of FIG. 2 in that electrical grid 300 of FIG. 3 has a Point Of Utilization 379 (POU 379) that is also a Point Of Interconnection 275 (POI 275) for energy generation facility 205.

As discussed above with respect to electrical grid 200 of FIG. 2, in some embodiments, the POU 279 or 379 can be a point at a sub-component or host of the electrical grid 200, such as a substation 310 or switching station, or any other point of the electrical grid desired, as discussed herein, and/or as known in the art, and/or as developed after the time of filing.

In some embodiments, such as electrical grid 200 of FIG. 2, the POU 279 is separate and distinct, and/or physically removed, from any POI 271, 273, 275, and 277 of any of energy generation facilities 201, 203, 205, and 207. In other embodiments, such as electrical grids 300 of FIGS. 3, the POU, such as POU 379 may be a point of interconnection, such as POI 275 for an energy generation facility 205, of energy generation facilities 201, 203, 205, and 207. This is the case illustrated for electrical grid 300 of FIG. 3 where the POU 379 and POI 275 for energy generation facility 205 are the same common point POU 379/POI 275 located within substation 310.

In addition, electrical grid 300 of FIG. 3 differs from electrical grid 200 of FIG. 2 in that electrical grid 300 of FIG. 3 has control signal data transfer systems 281, 283, 285, and 287 in communication with RTUs 301, 303, 305, and 307, respectively of each of electrical energy generation facilities 201, 203, 205, and 207.

As discussed above with respect to respect to FIG. 2 and electrical grid 200 of FIG. 2, in various embodiments, such as electrical grid 300 of FIG. 3, control signal data transfer systems 281, 283, 285, and 287 are in communication with respective RTUs 301, 303, 305, and 307 of each of energy generation facilities 201, 203, 205, and 207 which, in turn, are in communication with the respective control units 221, 223, 225, and 227 of energy generation facilities 201, 203, 205, and 207 by RTU/control signal data transfer systems 302, 304, 306, and 308, respectively.

As noted above, although in the FIGS. herein the data collection/monitoring data transfer systems, such as data collection/monitoring data transfer systems 291, 293, 295, and 297, and/or POU monitoring data transfer system 299, and/or control signal data transfer systems 281, 283, 285, and 287 are shown for simplicity as lines, as noted above, in various embodiments, any of data collection/monitoring data transfer systems 291, 293, 295, and 297, and/or POU monitoring data transfer system 299, and/or control signal data transfer systems 281, 283, 285, and 287 can include wired or wireless data transfer systems including, but not limited to hard-wired data lines, wireless microwave data transmission systems, optical data transmission systems, Bluetooth systems and/or any data transmission system capable of obtaining, transmitting, and/or receiving information as discussed herein, and/or as known or available in the art at the time of filing, and/or as becomes known or available after the time of filing.

Referring to FIGS. 3 and 5 together, as discussed above with respect to respect to FIG. 2 and electrical grid 200 of FIG. 2, in various embodiments, such as electrical grid 300 of FIG. 3, control signals represented in control signal data 514 are then used by the control units 221, 223, 225, and 227 of the respective energy generation facilities 201, 203, 205, and 207 to adjust the energy generation sources 211, 213, 215, and 217, respectively, to provide the desired voltage output at the respective output terminals 231, 233, 235, and 237, and POIs 271, 273, 275, and 277, of the electrical energy generation facilities 201, 203, 205, and 207 and to control reactive power production.

In all other aspects, the operation of electrical grid 300 of FIG. 3 is substantially similar to the operation of electrical grid 200 of FIG. 2. Consequently, the reader is directed to the discussion of the structure and operation of electrical grid 200 of FIG. 2 above with respect to FIGS. 2 and 5 for more details regarding the structure and operation of electrical grid 300 of FIG. 3.

FIG. 4 is a simplified block diagram of another embodiment of an electrical grid 400 utilizing one embodiment of the disclosed Master Grid Controller (MGC) that is hosted by a substation and includes a second sub-station, and Remote Terminal Units (RTUs) at each of the energy generation facilities and the second sub-station, a reactive control unit, and switched reactive components, in accordance with one embodiment.

Electrical grid 400 of FIG. 4 is similar to electrical grid 200 of FIG. 2 and like elements are similarly labeled in FIGS. 2 and 4. Therefore the discussion above with respect to electrical grid 200 of FIG. 2 is incorporated in the below discussion of electrical grid 400 of FIG. 4 in its entirety.

Referring to both FIGS. 2 and 4, electrical grid 400 of FIG. 4 differs from electrical grid 200 of FIG. 2 in that electrical grid 400 of FIG. 4 shows MGC 280 located in substation 310 that is the host sub-system for MGC 280.

In addition, electrical grid 400 of FIG. 4 differs from electrical grid 200 of FIG. 2 in that electrical grid 400 of FIG. 4 has a Point Of Utilization 379 (POU 379) that is also a Point Of Interconnection 275 (POI 275) for energy generation facility 205.

As discussed above with respect to electrical grid 200 of FIG. 2 and electrical grid 300 of FIG. 3, in some embodiments, the POU 279 or 379 can be a point at a sub-component or host of the electrical grid 200, such as a substation 310 or 410, or switching station, or any other point of the electrical grid desired, as discussed herein, and/or as known in the art, and/or as developed after the time of filing.

In some embodiments, such as electrical grid 200 of FIG. 2, the POU 279 is separate and distinct, and/or physically removed, from any POI 271, 273, 275, and 277 of any of energy generation facilities 201, 203, 205, and 207.

In other embodiments, such as electrical grid 400 of FIG. 4, the POU 379 may be a point of interconnection, such as POI 275 for an energy generation facility 205 of energy generation facilities 201, 203, 205, and 207. This is the case illustrated for electrical grid 400 of FIG. 4 where the POU 379 and POI 275 for electrical energy generation facility 205 are the same common point POU 379/POI 275 hosted by substation 310.

In addition, electrical grid 400 of FIG. 4 differs from electrical grid 200 of FIG. 2 in that electrical grid 400 of FIG. 4 has control signal data transfer systems 281, 283, 285, and 287 in communication with RTUs 301, 303, 305, and 307, respectively of each of energy generation facilities 201, 203, 205, and 207.

As discussed above with respect to respect to FIG. 2 and electrical grid 200 of FIG. 2, in various embodiments, such as electrical grid 400 of FIG. 4, control signal data transfer systems 281, 283, 285, and 287 are in communication with respective RTUs 301, 303, 305, and 307, respectively of each of energy generation facilities 201, 203, 205, and 207 which, in turn, are in communication with the respective control units 221, 223, 225, and 227 of energy generation facilities 201, 203, 205, and 207 by RTU/Control signal data transfer systems 302, 304, 306, 308, and respectively.

As noted above, although in the FIGS. herein the data collection/monitoring data transfer systems, such as data collection/monitoring data transfer systems 291, 293, 295, and 297, and/or POU monitoring data transfer system 299, and/or control signal data transfer systems 281, 283, 285, and 287 are shown for simplicity as lines, as noted above, in various embodiments, any of data collection/monitoring data transfer systems 291, 293, 295, and 297, and/or POU monitoring data transfer system 299, and/or control signal data transfer systems 281, 283, 285, and 287 can include wired or wireless data transfer systems including, but not limited to hard-wired data lines, wireless microwave data transmission systems, optical data transmission systems, Bluetooth systems and/or any data transmission system capable of obtaining, transmitting, and/or receiving information as discussed herein, and/or as known or available in the art at the time of filing, and/or as becomes known or available after the time of filing.

Referring to FIGS. 4 and 5 together, as discussed above with respect to respect to FIG. 2 and electrical grid 200 of FIG. 2, in various embodiments, such as electrical grid 400 of FIG. 4, control signals represented in control signal data 514 are then used by the control units 221, 223, 225, and 227 of the respective energy generation facilities 201, 203, 205, and 207, to adjust the energy generation sources 211, 213, 215, and 217, respectively, to provide the desired voltage output at the respective output terminals 231, 233, 235, and 237, and POIs 271, 273, 275, and 277, of the energy generation facilities 201, 203, 205, and 207 and to control reactive power production.

It is again important to point out that, in contrast to prior art "multi-master" systems, the disclosed methods and systems utilize a dedicated MGC 280 that is separate and distinct from any of the control units 221, 223, 225, and 227, for controlling various parameters of their respective energy generation sources 211, 213, 215, and 217. Therefore, using the disclosed methods and systems, the complications and inefficiencies of prior art "multi-master" systems is avoided.

In addition, as shown in FIG. 4, electrical grid 400 of FIG. 4 has substation output collection/monitoring data transfer system 491 coupled to substation POI 471 which, like energy generation facility collection/monitoring data transfer systems 291, 293, 295, and 297, is coupled to MGC 280 and provides substation output data for substation 410.

As noted above, although in the FIGS. herein the data collection/monitoring data transfer systems, such as substation output collection/monitoring data transfer system 491, and/or energy generation facility collection/monitoring data transfer systems 291, 293, 295, and 297 are shown for simplicity as lines, in various embodiments, any of substation output collection/monitoring data transfer system and/or data collection/monitoring data transfer systems 291, 293, 295, and 297, and/or POU monitoring data transfer system 299, and/or control signal data transfer systems 281, 283, 285, and 287 can include wired or wireless data transfer systems including, but not limited to hard-wired data lines, wireless microwave data transmission systems, optical data transmission systems, Bluetooth systems and/or any data transmission system capable of obtaining, transmitting, and/or receiving information as discussed herein, and/or as known or available in the art at the time of filing, and/or as becomes known or available after the time of filing.

In addition, as shown in FIG. 4, electrical grid 400 of FIG. 4 has control signal data transfer system 402 in communication with RTU 401 of second substation 410. In one embodiment, RTU 401 of second substation 410 is then in communication with reactive control 450 and/or control 420 by lines 404 and/or 406, respectively.

Control signals represented in control signal data 514 can be used to control voltage at POI 471 of second substation 410. In addition, in one embodiment, control signals represented in control signal data 514 can be used by reactive control 450 for controlling reactive power provided by one or more switched and/or dynamic reactive components represented by dedicated reactive components 490 such as STATCOMs, and/or reactors, and/or capacitors (not shown).

In addition, electrical grid 400 includes a power system, such as power system 270 of electrical grid 200 of FIG. 2, illustrated somewhat more realistically as a system of power systems, such as transmission lines, 470 distributed throughout electrical grid 400.

In all other aspects, the operation of electrical grid 400 of FIG. 4 is substantially similar to the operation of electrical grid 200 of FIG. 2 and electrical grid 300 of FIG. 3. Consequently, the reader is directed to the discussion of the structure and operation of electrical grid 200 of FIG. 2 and electrical grid 300 of FIG. 3 above with respect to FIGS. 2, 3, and 5 for more details regarding the structure and operation of electrical grid 400 of FIG. 4.

Operation

One specific illustrative example of the operation of specific illustrative examples of the disclosed electrical grids using the disclosed MGCs in accordance with various embodiments is now presented.

Referring to FIGS. 2, 3, 4, and 5 together, in operation of various embodiments, the energy generation facilities 201, 203, 205, and 207 operate in voltage control mode to maintain the voltage at their respective Points Of Interconnection (POIs) 271, 273, 275, and 277. Since any or all of energy generation facilities 201, 203, 205, and 207 may be renewable energy generation source-based energy generation facilities, the individual energy generation facilities 201, 203, 205, and 207 may not output the same amount of reactive power as a percentage of their capability at all times.

As discussed above, over time, it is possible that some of the energy generation facilities' reactive power production will drift apart to the point that some energy generation facilities 201, 203, 205, and 207 are producing reactive power while others are absorbing reactive power. This exchange of reactive power between energy generation facilities 201, 203, 205, and 207 can result in increased losses, reduced equipment capacity, and other problems without contributing to the overall generation of the energy generation facilities 201, 203, 205, and 207.

According to one or more of the disclosed embodiments, to maintain a stable transmission voltage on power system 270 and electrical grid 200, reactive power support is coordinated to share reactive power supply requirements and minimize reactive power exchange between the energy generation facilities 201, 203, 205, and 207.

To handle this coordination, in one embodiment, the disclosed Master Grid Controller (MGC) 280 monitors and coordinates reactive power output of the energy generation facilities 201, 203, 205, and 207 on the power system 270 and electrical grids 200, 300 and 400. In one embodiment, MGC 280 reads energy generation facility output data 502 from RTUs 301, 303, 305, 307, 401, and/or the meters, and/or relays, and/or control units 221, 223, 225, and 227, and/or any other source of energy generation facility output data 502, at each of the energy generation facilities 201, 203, 205, and 207 using collection/monitoring data transfer systems 291, 293, 295, and 297. MGC 280 also reads POU data 504 at the point of utilization 279/379 via POU monitoring data transfer system 299.

In various embodiments, the energy generation facility output data 502 includes, but is not limited to, real power, reactive power, voltage, breaker status, and/or any other energy generation facility output data relevant to MGC 280 operation, as discussed herein, and/or as known in the art at the time of filing, and/or as becomes known/available after the time of filing.

In various embodiments, the POU data 504 includes, but is not limited to, real power, reactive power, voltage, breaker status, and/or any other POU data relevant to MGC 280 operation, as discussed herein, and/or as known in the art at the time of filing, and/or as becomes known/available after the time of filing.

In one embodiment, in addition to the need to coordinate reactive power support, studies have indicated that taking certain lines out of service may result in temporary voltage levels on power system 270 of up to 1.20 pu. Consequently, the disclosed MGC 280 must operate in such a way that the energy generation sources 211, 213, 215, and 217 at each energy generation facility 201, 203, 205, and 207 are able to maintain their voltage ride through capability to withstand the high voltage levels and help bring the transmission voltage back within normal range.

In one embodiment, MGC 280 coordinates the output at POIs 271, 273, 275, and 277 from the multiple energy generation facilities 201, 203, 205, and 207 and multiple energy generation source 211, 213, 215, and 217 manufacturers. In addition, in one embodiment, MGC 280 monitors and controls the operation of switched components, such as dedicated reactive components 490.

As discussed above, in one embodiment, MGC 280 coordinates the reactive power support provided by the energy generation facilities 201, 203, 205, and 207 and other dedicated reactive power components 490 on power system 270 and electrical grids 200, 300 and 400 near the POU 279/379. However, as also noted, MGC 280 is not intended to directly control the reactive power output of the energy generation facilities 201, 203, 205, and 207.

Instead, MGC 280 performs two functions. First MGC 280 monitors the voltage at the POU 279/379 and maintains voltage at the POU 279/379 within a user-programmable dead band by requesting adjustments to the voltage set point of each of the energy generation facilities 201, 203, 205, and 207 to raise or lower the voltage on power system 270 and electrical grid 200 near the POU 279/379, i.e., using voltage control mode operation.

Second MGC 280 monitors the operation of each of the energy generation facilities 201, 203, 205, and 207 and requests adjustments to the voltage set point of each of the of the energy generation facilities 201, 203, 205, and 207 to keep each of the energy generation facilities 201, 203, 205, and 207 at approximately the same reactive power output as a percentage of its capability as the others.

In one embodiment, both of these MGC 280 functions are performed in succession and the final calculated voltage offset value is transmitted to each of the energy generation facilities 201, 203, 205, and 207 via control signals included in control signal data 514 on control signal data transfer systems 281, 283, 285, and 287. In some cases, the sum of both functions may be zero if the requested adjustments cancel each other.

The desired operation of the energy generation facilities 201, 203, 205, and 207 near POU 279/379 is that they will all work together to support the transmission voltage on power system 270 and electrical grid 200, 300, or 400.

For example, if the transmission voltage on power system 270 and electrical grid 200, 300, or 400 is low, the energy generation facilities 201, 203, 205, and 207 will all be sent control signals on control signal data transfer systems 281, 283, 285, and 287 requesting them to raise voltage so that the transmission voltage monitored at POU 279/379 is brought into the desired range.

Ideally, each of the energy generation facilities 201, 203, 205, and 207 would output the same amount of reactive power as a percentage of its total available reactive power capability.

In practice, it is expected that there will be some variation in output between the energy generation facilities 201, 203, 205, and 207. This variation is normal and acceptable when small. However, as the conditions in the area, such as wind or cloud cover/available sunlight, change, this will tend to cause some of renewable energy source-based energy generation facilities 201, 203, 205, and 207 to change their real power output before other energy generation facilities 201, 203, 205, and 207. This may lead to larger variations in reactive power output as the energy generation facilities 201, 203, 205, and 207 capabilities change.

In extreme situations this variability in output can cause energy generation facilities 201, 203, 205, and 207 to drive to opposite limits of their capabilities, with some energy generation facilities 201, 203, 205, and 207 supplying a large amount of reactive power and others absorbing a large amount of reactive power. Although this difference in output may settle to a stable point where transmission voltage on power system 270 and electrical grid 200, 300, or 400 is held to the desired level, the bulk of the reactive power is simply exchanged between the energy generation facilities 201, 203, 205, and 207 and does little to contribute to the operation of the power system 270 and electrical grid 200, 300, or 400. Using the disclosed embodiments, the same net effect on voltage can be obtained at a reduced reactive power output while also lowering the losses caused by the unnecessary reactive power flow.

In one embodiment, to accomplish the voltage regulation function, MGC 280 monitors voltage at POU 279/379 by comparing a rolling average voltage at POU 279/379 to a desired voltage level and voltage dead band. In one embodiment, MGC 280 determines if the energy generation facilities 201, 203, 205, and 207 should increase or decrease their voltage. In one embodiment, MGC 280 then generates control signals requesting that all energy generation facilities 201, 203, 205, and 207 adjust their output in the same direction (all up or all down).

In one embodiment, to accomplish the reactive power balancing function, MGC 280 monitors the output of the nearby energy generation facilities 201, 203, 205, and 207 at the points of POIs 271, 273, 275, and 277 and compares these outputs, including reactive power, i.e., vars, to determine when one or more energy generation facilities 201, 203, 205, and 207 may be exchanging reactive power.

As an example, consider the case where voltage at POU 279/379 is currently within the acceptable band. In this example, we stipulate that of the four energy generation facilities 201, 203, 205, and 207, three of them, energy generation facilities 201, 203, and 205, are currently producing roughly 20% of their reactive power capability. The fourth energy generation facility, energy generation facility 207, however is currently absorbing approximately 5% of its capability. Although the net effect is that the voltage at POU 279/379 is maintained within band, some of the output of the three producing energy generation facilities 201, 203, and 205 is only being used to supply reactive power to the fourth energy generation facility 207.

In this illustrative example, MGC 280 will send a control signal to energy generation facility 207 on control signal data transfer system 287 requesting energy generation facility 207, which is absorbing reactive power, to increase its voltage at its POI 277 in order to supply additional reactive power to the POI 277. Similarly, and simultaneously, in this illustrative example, MGC 280 will send control signals on control signal data transfer systems 281, 283, and 285 to energy generation facilities 201, 203, and 205 requesting energy generation facilities 201, 203, and 205, which are producing reactive power, to decrease their voltage at their respective POIs 271, 273, and 275, in order to supply less reactive power at POIs 271, 273, and 275. In this example, the net amount of reactive power supplied to the power system 270 and electrical grid 200, 300, or 400 remains the same and voltage at POU 279/379 will not change, but less reactive power will be exchanged between the energy generation facilities 201, 203, 205, and 207.

In one embodiment, the maximum capability of each energy generation facility 201, 203, 205, and 207 to both supply and absorb reactive power will be used to determine when a voltage-raise or a voltage-lower command control signal will be generated by the control unit for each energy generation facility 201, 203, 205, and 207. In one embodiment, if the sum of reactive power output from all energy generation facilities 201, 203, 205, and 207 is greater than or equal to zero, the maximum capability for each energy generation facility 201, 203, 205, and 207 to supply reactive power will be used in the calculations and logic. If the sum of reactive power output from all energy generation facilities 201, 203, 205, and 207 is below zero, the maximum capability for each energy generation facility 201, 203, 205, and 207 to absorb reactive power will be used in the calculations and logic.

In some embodiments, the power systems and electrical grids, such as power system 270 and electrical grid 400 of FIG. 4, may include dedicated reactive components 490 such as reactor banks, capacitors and STATCOMs. In these instances, the dedicated reactive components 490 can be applied to extend the range of the energy generation facilities 201, 203, 205, and 207 reactive power capabilities. For instance, dedicated reactive components 490 may include reactor banks that can be switched based on the reactive power supplied or absorbed by the energy generation facilities 201, 203, 205, and 207 by reactive control 450 and/or dynamic reactive components such as STATCOMs. Likewise, dedicated reactive components 490 may include a capacitor bank that may be switched by reactive control 450 based on the reactive power flow through a power transformer at or near the POU 279/379 of substation 310.

The switched devices switching order can be programmed to minimize switching of reactor banks. In this example, the switching order can be determined by operation count of, and voltage level associated with, each switched device.

As noted above, in one embodiment, one function of MGC 280 is to maintain balanced reactive power output from each of the monitored energy generation facilities 201, 203, 205, and 207 while allowing the energy generation facilities 201, 203, 205, and 207 control units 221, 223, 225, and 227 to maintain voltage at the POIs 271, 273, 275, and 277 in voltage control mode. MGC 280 will also control the voltage at the POU 279/379 within a specified dead band. To accomplish these functions, some of the functionality for the electrical grid 200, 300, or 400 resides within MGC 280 (see FIG. 5 and the discussion above) and some resides in the individual energy generation facility 201, 203, 205, and 207 control units 221, 223, 225, and 227.

In one embodiment, MGC 280 operates in a looped fashion, checking the output of the energy generation facilities 201, 203, 205, and 207 and deciding if a correction is needed.

To this end, in one embodiment, MGC 280 reads the voltage, reactive power output, and reactive power capability of each energy generation facility 201, 203, 205, and 207 from the energy generation facility 201, 203, 205, and 207's local RTUs (not shown in FIG. 2, but shown in FIGS. 3 and 4 as RTUs 301, 303, 305, and 307). In one embodiment, MGC 280 will also read the voltage at POU 279/379. In one embodiment, these values will be polled by MGC 280 every five seconds.

In one embodiment, following each data poll, MGC 280 will calculate the average of the three phase voltages at the POU 279/379. In addition, following each poll, MGC 280 will calculate the rolling average POU 279/379 voltage reading for a define period. The rolling average will use the three-phase voltage average calculated in the previous step.

In one embodiment, Loss of Potential (LOP) logic will check if the average POU 279/379 voltage calculated is below 85%. If an LOP condition is detected, the rolling average voltage calculation will stop. Once the LOP condition is addressed and fixed, the rolling average calculation will begin. Old voltage readings will not be used upon clearing the LOP condition.

In one embodiment, MGC 280 will calculate the total reactive power output of all included energy generation facilities 201, 203, 205, and 207 by summing the present reactive power output of the individual energy generation facilities 201, 203, 205, and 207.

In one embodiment, MGC 280 will calculate the total reactive power capability of all included energy generation facilities 201, 203, 205, and 207 by summing the present reactive power capability of the individual energy generation facilities 201, 203, 205, and 207.

If the total reactive power output for the energy generation facilities 201, 203, 205, and 207 is positive, the reactive power sourcing capability (supplying) of each energy generation facility 201, 203, 205, and 207 will be used to calculate the total reactive power capability of all included energy generation facilities 201, 203, 205, and 207.

If the total reactive power output for the energy generation facilities 201, 203, 205, and 207 is negative, the reactive power sinking capability (absorbing) of each energy generation facility 201, 203, 205, and 207 will be used to calculate the total reactive power capability of all included energy generation facilities 201, 203, 205, and 207.

In all cases above, readings with bad quality or that are outside a realistic range will not be included in the calculated averages.

In one embodiment, for POU 279/379 voltage regulation, the average POU 279/379 voltage reading is compared against a dead band. If the average POU 279/379 voltage reading is above the dead band, a voltage offset control signal will be sent to all energy generation facilities 201, 203, 205, and 207 to reduce their voltage at their respective POIs 271, 273, 275, and 277.

If the average POU 279/379 voltage is below the dead band, a voltage offset control signal will be sent to all energy generation facilities 201, 203, 205, and 207 to increase their voltage at their respective POIs 271, 273, 275, and 277.

In one embodiment, for reactive power balancing among the energy generation facilities 201, 203, 205, and 207, every processing cycle, MGC 280 will calculate the percentage of the total reactive power capability that is being produced by the included energy generation facilities 201, 203, 205, and 207 as a whole. In one embodiment, every processing cycle, MGC 280 will calculate the percentage of the reactive power capability that is being produced by each energy generation facility 201, 203, 205, and 207 individually.

For each energy generation facility 201, 203, 205, and 207 outputting a percentage of its reactive power capability that is higher than the percentage of the group as a whole, MGC 280 will send that energy generation facility 201, 203, 205, and 207 a negative voltage offset control signal to reduce its voltage. If the difference between the individual energy generation facility 201, 203, 205, and 207's output and the group output is less than voltage dead band percentage, the voltage offset will not be sent.

In one embodiment, if communication to an individual energy generation facility 201, 203, 205, and 207's control unit 221, 223, 225, and 227 has failed, the voltage offset will not be sent. In one embodiment, each individual energy generation facility 201, 203, 205, and 207's control unit 221, 223, 225, and 227 is expected to act upon the set point until the set point is changed by MGC 280. This includes holding the last sent set point indefinitely if communication to MGC 280 fails.

For each energy generation facility 201, 203, 205, and 207 outputting a percentage of its reactive power capability that is lower than the percentage of the group as a whole, MGC 280 will result in a control signal being sent to that energy generation facility 201, 203, 205, and 207 causing a positive voltage offset to increase its voltage. In one embodiment, If the difference between the individual energy generation facility 201, 203, 205, and 207's output and the group output is less that voltage dead band percentage, the voltage offset control signal will not be sent.

In one embodiment, the voltage regulation and reactive power balancing functions are run in succession. It is possible MGC 280's resulting voltage offset step change for a given energy generation facility 201, 203, 205, and 207 may be zero, a single step change, or a double step change.

When dedicated reactive components 490, such as switched capacitors and reactors, and/or STATCOMs are included in the electrical grid, such as is the case with electrical grid 400, MGC 280 will also operate these components.

In one embodiment, operation of any switched reactor banks of dedicated reactive components 490 will be on a rotational basis to equalize the number of operations of each device. In one embodiment, the switched reactor banks will be operated based on the total measured var flow in or out of the energy generation facilities 201, 203, 205, and 207. All energy generation facilities 201, 203, 205, and 207 will be included in this measurement.

In one embodiment, the control units 221, 223, 225, and 227 of energy generation facility 201, 203, 205, and 207, respectively, operate independently in voltage control mode. In one embodiment, the control units 221, 223, 225, and 227 of energy generation facility 201, 203, 205, and 207, respectively, report their respective energy generation facility 201, 203, 205, and 207 present reactive power output capability (both supplied and absorbed) to its local RTU (not shown in FIG. 2, RTUs 301, 303, 305, and 307 in FIG. 3) when polled by the RTU. In one embodiment, this data will then be forwarded to MGC 280.

In normal operation, each energy generation facility 201, 203, 205, and 207 will determine the amount of reactive power required to maintain the voltage target set point at the respective POI 271, 273, 275, and 277. In one embodiment, when MGC 280 sends a control signal command to each energy generation facility 201, 203, 205, and 207 control unit 221, 223, 225, and 227, respectively, the respective control unit 221, 223, 225, and 227 increases or decreases the reactive power of its respective energy generation facility 201, 203, 205, and 207 output as appropriate to the control signal command received.

In one embodiment, this change in output will be created by adding to the voltage reference of given energy generation facility 201, 203, 205, and 207 and maintaining that set point until MGC 280 provides a new set point. In one embodiment, the target set point each energy generation facility 201, 203, 205, and 207 will be held by the respective control unit 221, 223, 225, and 227 in the event of a communication failure to MGC 280.

In the event of a high or low voltage event, the control unit 221, 223, 225, and 227 for each respective energy generation facility 201, 203, 205, and 207 will automatically enter the appropriate voltage ride-through mode for the length of the event or as long as their ride-through capability allows.

In one embodiment, each control unit 221, 223, 225, and 227 for each respective energy generation facility 201, 203, 205, and 207 will be responsible for monitoring its own local voltage and limiting operation to prevent the tripping of energy generation sources, such as wind turbines, due to high or low voltages produced when adjusting var output. The absorption or production of more reactive power by a given energy generation facility 201, 203, 205, and 207 will be determined by the reactive power capability reported by the respective control unit 221, 223, 225, and 227 for each energy generation facility 201, 203, 205, and 207.

Those of skill in the art will readily recognize that the operations described above are but one illustrative example of numerous potential operational steps, modes, parameters, measured quantities, signals, and conditions that could be used with the disclosed methods and systems. Consequently, the specific illustrative operational steps, modes, parameters, measured quantities, signals, and conditions discussed above with respect to specific illustrative embodiments does not limit the scope of the claims below.

Process

Figure 6:
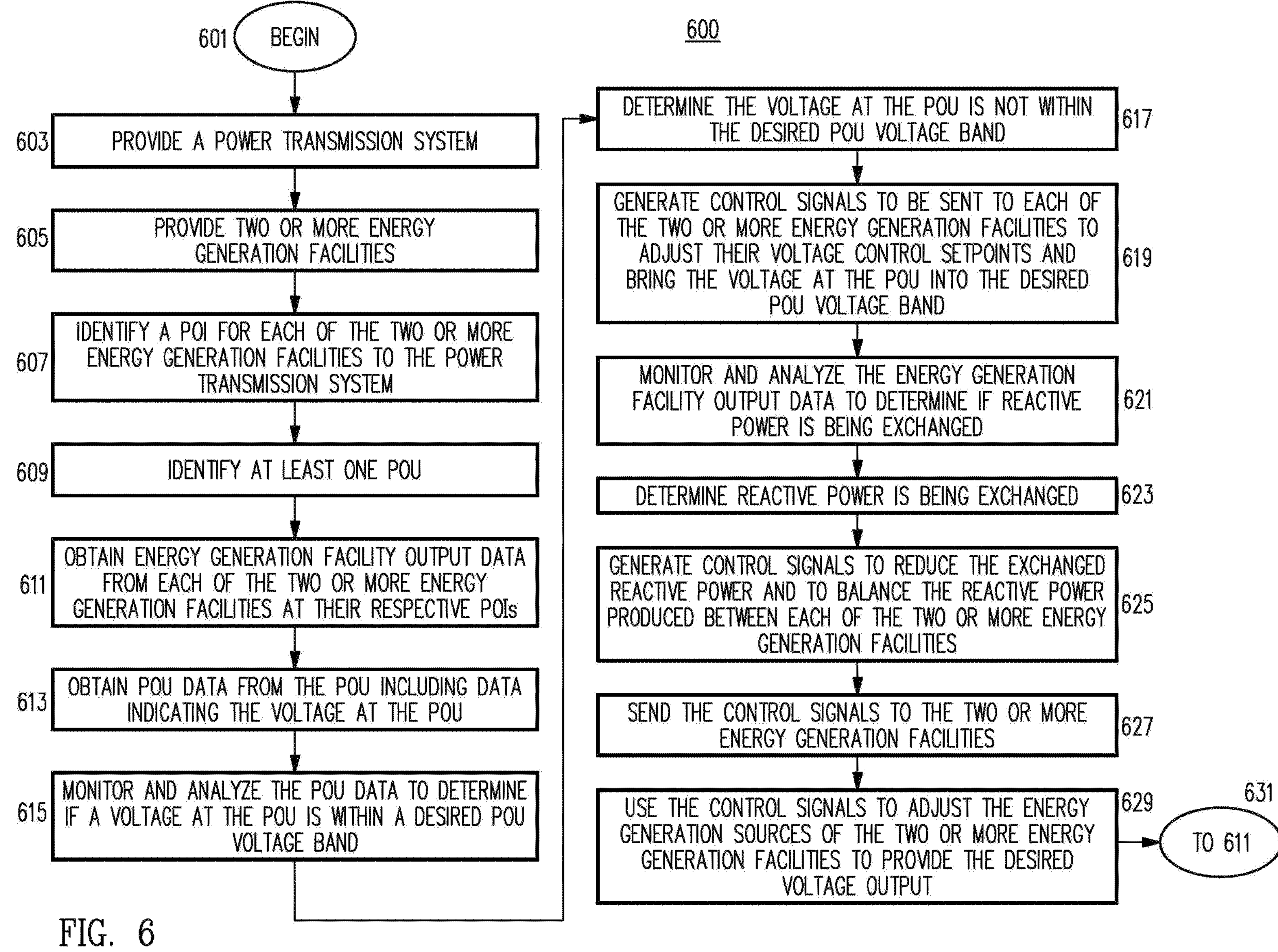
FIG. 6 is a flow chart of a method/process for controlling voltage and reactive power for electrical grids in accordance with one embodiment.

FIG. 6 is a flow chart of a process 600 for controlling voltage and reactive power for electrical grids in accordance with one embodiment.

In one embodiment, process 600 begins at 601. In one embodiment, process flow proceeds from 601 to 603. In one embodiment, at 603 a power system is provided and made accessible. In various embodiments, the power system is a collection of transmission lines used to connect the various components of an electrical grid, such as electrical grids 200, 300, or 400 of FIGS. 2, 3, and 4, and/or any other electrical grid as described herein, and/or as known in the art, and/or as developed/made available after the time of filing.

Once a power system is provided and made accessible at 603, process proceeds to 605. In one embodiment, at 605 two or more energy generation facilities are provided. In one embodiment, the two or more energy generation facilities of 605 can be any one or more of, including various combinations of, renewable energy source-based energy generation facilities, such as wind farms, solar farms, hydroelectric, or any other renewable energy source-based energy generation facilities, as discussed herein, and/or as known in the art at the time of filing, and/or as developed/made known after the time of filing; traditional fossil fuel-based energy generation facilities, as discussed herein, and/or as known in the art at the time of filing, and/or as developed/made known after the time of filing; nuclear-based energy generation facilities, as discussed herein, and/or as known in the art at the time of filing, and/or as developed/made known after the time of filing; electrical storage components such as battery banks, as discussed herein, and/or as known in the art at the time of filing, and/or as developed/made known after the time of filing; reactive power energy generation facilities such as inductor banks/reactors, capacitors, STATCOMs, or any other reactive power energy generation facilities, as discussed herein, and/or as known in the art at the time of filing, and/or as developed/made known after the time of filing; sub-stations; switching stations; or any other energy generation facilities as discussed herein, and/or as known in the art at the time of filing, and/or as developed/made known after the time of filing.

In one embodiment, each of the two or more energy generation facilities has an energy generation source, such as wind driven turbines for converting kinetic wind energy into electrical energy, solar panels for converting solar radiation energy into electrical energy, hydro-turbines for converting kinetic water energy into electrical energy, nuclear reactors for converting controlled nuclear reactions into heat energy to heat steam to drive steam turbines for generating electrical energy, fossil fuel generators for converting chemical energy into electrical energy, and/or any other energy generation sources used to generate electrical energy as discussed herein, and/or as known in the art at the time of filing, and/or as developed/made known after the time of filing.

In one embodiment, each of the two or more energy generation facilities includes a control unit for controlling various parameters of their respective energy generation sources to provide a desired electrical energy output. In one embodiment, each of the two or more energy generation facilities provides an electrical energy output at an output terminal "out."

In one embodiment, once two or more energy generation facilities are provided at 605, process flow proceeds to 607. In one embodiment, at 607 the two or more energy generation facilities provided at 605 are connected to the power system of 603 and the Points of Interconnection (POIs) of each of the two or more energy generation facilities are identified.

In one embodiment, each of the two or more energy generation facilities provides the generated electrical energy at its output terminal to a POI of that energy generation facility to the power system. As noted above, in various embodiments, the power system is a collection of transmission lines interconnecting the two or more energy generation facilities and providing for the transmission of the combined electrical energy produced at the two or more energy generation facilities to various locations such as a POU, substations, switching stations, communities and facilities consuming the electrical energy, other power systems and/or other electrical grids, and/or any other destinations or subdestinations for the generated electrical energy, as discussed herein, and/or as known in the art at the time of filing, and/or as developed/made known after the time of filing.

In one embodiment, once the two or more energy generation facilities provided are connected to the power system and the POI of each of the two or more energy generation facilities are identified, process flow proceeds to 609. In one embodiment at 609 at least one Point Of Utilization (POU) is selected and identified.

In one embodiment, at least one POU can be a point at a sub-component of the electrical grid, such as a substation or switching station, or any other point of the electrical grid desired, as discussed herein, and/or as known in the art, and/or as developed after the time of filing. In some embodiments, the POU is separate and distinct, and/or physically removed, from any POI of any of the two or more energy generation facilities. In other embodiments, the POU may be a POI for one or more energy generation facilities.

In one embodiment, once at least one POU is selected and identified at 609, process flow proceeds to 611. In one embodiment, at 611 the outputs of the energy generation facilities at the POI of each energy generation facility to the power system of the electrical grid are monitored and energy generation facility output data is obtained.

In various embodiments, the output data from each energy generation facility includes, but is not limited to, real power, reactive power, voltage, breaker status, and/or any other energy generation facility output data as discussed herein, and/or as known in the art at the time of filing, and/or as becomes known/available after the time of filing.

In one embodiment, an MGC, such as the disclosed MGCs, measures the outputs of the energy generation facilities under its control at the POI of each energy generation facility to the power system of the electrical grid.

Of note, in contrast to prior art "multi-master" systems, the disclosed methods and systems utilize a dedicated MGC that is separate and distinct from any of the control units for controlling various parameters of their respective energy generation sources. Therefore, using the disclosed methods and systems, the complications and inefficiencies of prior art "multi-master" systems is avoided.

In one embodiment, the MGC includes a data collection module for collecting energy generation facility output data from each of the two of more energy generation facilities at their respective points of interconnection. To this end, in one embodiment, various output monitoring data transfer systems for collecting output data from each of the two or more energy generation facilities at their respective POIs are in communication with the MGC data collection module and the POIs of each of the energy generation facilities.

In one embodiment, the MGC data collection module of the disclosed MGC collects energy generation facility output data from each energy generation facility connected to the power systems of an electrical grid at the point of interconnection.

In one embodiment, once the outputs of the energy generation facilities at the POI of each energy generation facility to the power system of the electrical grid are monitored and energy generation facility output data is obtained at 611, process flow proceeds to 613. In one embodiment, at 613 POU data from at least one POU is monitored and POU data is collected.

In various embodiments, the POU data includes but is not limited to, real power, reactive power, voltage, breaker status, and/or any other POU data as discussed herein, and/or as known in the art at the time of filing, and/or as becomes known/available after the time of filing.

In one embodiment, the disclosed MGC measures the voltage at the POU. In one embodiment, the MGC data collection module collects POU data from at least one POU. To this end, the MGC data collection module is also in communication with at least one POU via a POU monitoring data transfer system that can be one of the various output monitoring data transfer systems.

As noted above, although in the FIGS. herein the data collection/monitoring data transfer systems, and/or energy generation facility collection/monitoring data transfer systems, are shown for simplicity as lines, in various embodiments, any of substation output collection/monitoring data transfer system and/or data collection/monitoring data transfer systems, and/or POU monitoring data transfer systems, and/or control signal data transfer systems can include wired or wireless data transfer systems including, but not limited to hard-wired data lines, wireless microwave data transmission systems, optical data transmission systems, Bluetooth systems and/or any data transmission system capable of obtaining, transmitting, and/or receiving information as discussed herein, and/or as known or available in the art at the time of filing, and/or as becomes known or available after the time of filing.

In one embodiment, the primary source of energy generation facility output data and POU data for the MGC data collection module are the Remote Terminal Units (RTUs) of each energy generation facility and the POU host subsystem, e.g., the RTU of the substation hosting the MGC.

In some embodiments, meters, relays, control units, and any other energy generation facility output data sources discussed herein, and/or as known in the art at the time of filing, and/or as developed after the time of filing are sources of energy generation facility output data and POU data for the MGC data collection module.

In one embodiment, once POU data from at least one POU monitored and POU data is collected at 613, process flow proceeds to 615. In one embodiment, at 615 the collected energy generation facility output data and POU data is analyzed to determine when the output of the energy generation facilities must be adjusted to maintain voltage at the POU and thereby provide electrical grid stability.

In one embodiment, a disclosed MGC is used to determine when the output of the energy generation facilities must be adjusted to maintain voltage at the POU and thereby provide electrical grid stability. To this end, in one embodiment, the MGC includes an MGC data analysis module, including at least one processor and at least one memory unit. In one embodiment, the output data from each energy generation facility and the POU data are provided to the MGC data analysis module. In one embodiment, at the MGC data analysis module the voltage at the POU is monitored to ensure the voltage at the POU is within a defined/desired voltage band.

In one embodiment, at 617 a determination is made that the voltage at the POU is not within, i.e., is outside, the defined/desired voltage band. In one embodiment, once determination is made that the voltage at the POU is not within, i.e., is outside, the defined/desired voltage band a 617, process flow proceeds to 619.

In one embodiment, at 619 controls signals are generated to change the voltage control set points of all controlled energy generation facilities in a manner appropriate to bring the voltage at the POU into the desired band.

In one embodiment, the disclosed MGC is used to generate the control signals to change the voltage control set points of all controlled energy generation facilities in a manner appropriate to bring the voltage at the POU into the desired band.

To this end in one embodiment, the disclosed MGC includes an MGC data analysis module. In one embodiment, If the MGC data analysis module determines the voltage at the POU is outside the defined/desired voltage band, the MGC data analysis module generates control signals to be sent to each energy generation facility to adjust the output voltages of each energy generation facility at their respective POIs. In one embodiment, the control signals are used to adjust the voltage control set points of all controlled energy generation facilities in a manner appropriate to bring the voltage at the POU into the desired band.

In one embodiment, at 621 the output of the energy generation facilities output data is monitored and analyzed to identify locations where reactive power is being exchanged.

In one embodiment, at 623, locations where reactive power is being exchanged are identified and at 625 control signals are generated to adjust the outputs of the energy generation facilities to limit that reactive power exchange and/or share reactive power production across the energy generation facilities.

In one embodiment, the MGC is used to compare the output of the energy generation facilities to identify locations where reactive power is being exchanged and adjusts their outputs to limit that reactive power exchange and/or share reactive power production across the energy generation facilities. To this end, in one embodiment, the MGC data analysis module monitors the output data from each energy generation facility to identify locations where reactive power is being exchanged between energy generation facilities.

In one embodiment, if a determination is made by the MGC data analysis module that reactive power is being exchanged between energy generation facilities, the MGC data analysis module generates control signals to be sent to energy generation facilities to reduce the exchanged power. In one embodiment, the MGC data analysis module generates control signals to be sent to energy generation facilities to spread the production of reactive power evenly across the energy generation facilities based the maximum capabilities of each of energy generation facilities; in one embodiment as a common percentage of the maximum capabilities of each of energy generation facilities.

In one embodiment, once controls signals are generated to change the voltage control set points of all controlled energy generation facilities in a manner appropriate to bring the voltage at the POU into the desired band at 619 and/or control signals are generated to adjust the outputs of the energy generation facilities to limit that reactive power exchange and/or share reactive power production across the energy generation facilities at 625, process flow proceeds to 627.

In one embodiment, at 627 the control signals are then transmitted to the two or more energy generation facilities.

In one embodiment, a disclosed MGC is used to transmit the control signals to the two or more energy generation facilities. To this end, in one embodiment, the control signals generated by the MGC data analysis module are provided to an MGC control signal transmission module. The control signals are then transmitted from the MGC control signal transfer module to the energy generation facilities using various control signal data transfer systems for relaying control signals to the two or more energy generation facilities. Consequently, in one embodiment, the various control signal data transfer systems are in communication with both the MGC control signal transfer module and the two or more energy generation facilities.

As noted above, although in the FIGS. herein the data collection/monitoring data transfer systems, and/or energy generation facility collection/monitoring data transfer systems, are shown for simplicity as lines, in various embodiments, any of substation output collection/monitoring data transfer system and/or data collection/monitoring data transfer systems, and/or POU monitoring data transfer systems, and/or control signal data transfer systems can include wired or wireless data transfer systems including, but not limited to hard-wired data lines, wireless microwave data transmission systems, optical data transmission systems, Bluetooth systems and/or any data transmission system capable of obtaining, transmitting, and/or receiving information as discussed herein, and/or as known or available in the art at the time of filing, and/or as becomes known or available after the time of filing.

In one embodiment, the various control signal data transfer systems are in communication with the respective control units of the two or more energy generation facilities. In other embodiments, the various control signal data transfer systems are in communication with respective RTUs of the two or more energy generation facilities which, in turn, are in communication with the respective control units of the two or more energy generation facilities.

In various embodiments, the control signals are then used by the control units of the two or more energy generation facilities to adjust the energy generation sources to provide the desired voltage output at the respective output terminals, and points of interconnection, of the two or more energy generation facilities at 629.

In one embodiment, once the control signals are then used by the control units of the two or more energy generation facilities to adjust the energy generation sources to provide the desired voltage output at the respective output terminals, and points of interconnection, of the two or more energy generation facilities at 629, process 600 proceeds back to 611 to await new data in a looped operation.

In contrast to prior art master control systems that controlled to reactive power, in one embodiment, the energy generation facilities remain in voltage control mode and the disclosed MGC adjusts their voltage set points up or down in predetermined discrete steps. Since, using the disclosed embodiments, the energy generation facilities are controlled to voltage rather than reactive power, the energy generation facilities can operate in voltage control mode to maintain the voltage at their point of interconnection.

Consequently, the electrical grids using the disclosed methods/processes are provided the control of the prior master control units while also receiving the rapid reaction time benefits of energy generation facilities operating in voltage control mode with voltage droop. This allows the energy generation facilities to be adjusted flexibly and precisely when needed while, at the same time, leaving them able to quickly respond to electrical grid disturbances.

In addition, in one embodiment, reactive power is monitored, controlled and balanced so that using the disclosed embodiments, the energy generation facilities are not only controlled to voltage but can operate in voltage droop mode without significant exchanges of reactive power. The additional supervision of reactive power exchange between energy generation facilities also allows the disclosed methods/processes to control energy generation facilities spread out over a large geographic area while maintaining control at a single, central location, i.e., the point of utilization.

As discussed above, the disclosed methods/processes accommodate all types of energy generation facilities, in any combination, including renewable energy source-based energy generation facilities and any other energy generation facilities having fluctuating and unpredictable outputs. Consequently, the disclosed methods/processes are well suited to potentially weaker electrical grids.

In addition, as discussed above, when the disclosed methods/processes determine one or more energy generation facilities may be exchanging reactive power the disclosed methods/processes adjust the voltage set points of the energy generation facilities to reduce the exchanged power. Consequently, using the disclosed methods/processes the increased losses, reduced equipment capacity, and other problems associated with the excessive exchange of reactive power that does not contribute to the overall power generation of the energy generation facilities is avoided.

In addition, the disclosed methods/processes can be customized for a wide variety of installations and can therefore be applied to a wide variety of projects and numerous electrical grid configurations.

In addition, in contrast to prior art "multi-master" systems, the disclosed methods and systems utilize a dedicated MGC that is separate and distinct from any of the control units for controlling various parameters of their respective energy generation sources. Therefore, using the disclosed methods and systems, the complications and inefficiencies of prior art "multi-master" systems is avoided.

For these and numerous other reasons discussed herein, the disclosed methods/processes, and any electrical grid utilizing the disclosed methods/processes, represent a significant improvement over the prior art methods and systems.

The disclosed embodiments discussed above provide a solution to the long-standing technical problem of effectively and efficiently controlling power system voltages and reactive power production to accommodate renewable energy source-based energy generation facilities and the resulting potentially weaker electrical grids.

One embodiment of a system for controlling voltage and reactive power for an electrical grid includes two or more energy generation facilities, each of the two or more energy generation facilities including an energy generation facility control unit for controlling the energy generation sources that are associated with that energy generation facility to provide a desired electrical energy output from that energy generation facility.

One embodiment of a system for controlling voltage and reactive power for an electrical grid includes a power system and one or more Points Of Interconnection (POIs) for each of the two or more energy generation facilities to the power system.

One embodiment of a system for controlling voltage and reactive power for an electrical grid includes two or more energy generation facility output monitoring data transfer systems for collecting energy generation facility output data from each of the two or more energy generation facilities at their respective POIs, the energy generation facility output data including data indicating the output voltage of each of the two or more energy generation facilities at their respective POIs.

One embodiment of a system for controlling voltage and reactive power for an electrical grid includes at least one Point Of Utilization (POU) and a POU monitoring data transfer system for collecting POU data from the POU, the POU data including data indicating the voltage at the POU.

One embodiment of a system for controlling voltage and reactive power for an electrical grid includes two or more control signal data transfer systems for relaying control signals to each of the respective energy generation facility control units for each of the two or more energy generation facilities.

One embodiment of a system for controlling voltage and reactive power for an electrical grid includes a Master Grid Controller (MGC), the MGC being separate and distinct from the respective energy generation facility control units of each of the two or more energy generation facilities.

In one embodiment, the MGC provides control signals to the respective energy generation facility control units of the two or more energy generation facilities.

In one embodiment, the two or more-energy generation facility output monitoring data transfer systems, the POU monitoring data transfer system, and the two or more control signal data transfer systems are in communication with the MGC.

In one embodiment, the MGC monitors and analyzes the POU data to determine if a voltage at the POU is within a desired POU voltage band.

In one embodiment, if the MGC determines the voltage at the POU is not within the desired POU voltage band, the MGC generates control signals to be sent to each of the respective energy generation facility control units of the two or more energy generation facilities, the control signals being used to adjust voltage control set points of each of the two or more energy generation facilities at their respective POIs to bring the voltage at the POU into the desired POU voltage band.

In one embodiment, the MGC monitors and compares the energy generation facility output data of each energy generation facility to identify where reactive power is being exchanged between any of the two or more energy generation facilities.

In one embodiment, if the MGC identifies that reactive power is being exchanged between any of the two or more energy generation facilities, the MGC generates control signals to be sent to the respective energy generation facility control units of the two or more energy generation facilities, the control signals being used to reduce the exchanged reactive power between the each of the two or more energy generation facilities.

In one embodiment, the power system can include one or more of; a power distribution system; a power transmission system; Alternating Current (AC) systems or sub-systems; and/or Direct Current (DC) systems or sub-systems.

In one embodiment, the MGC provides at least some of the control signals to the respective energy generation facility control units of the two or more energy generation facilities using one or more wireless data transfer systems.

In one embodiment, the POU monitoring data transfer system collects at least part of the POU data from the POU using one or more wireless data transfer systems.

In one embodiment, the two or more control signal data transfer systems relay control signals to each of the respective energy generation facility control units for each of the two or more energy generation facilities using one or more wireless data transfer systems.

In one embodiment, the two or more energy generation facilities include one or more of a renewable energy-based energy generation facility, a traditional fossil fuel-based energy generation facility; and a nuclear-based energy generation facility.

In one embodiment, the POU is a point distinct from any of the POIs.

In one embodiment, the POU is also a POI for at least one of the two or more energy generation facilities.

In one embodiment, the two or more-energy generation facility output monitoring data transfer systems use one or more wireless data transfer systems for collecting energy generation facility output data from each of the two or more energy generation facilities.

One embodiment of a system for controlling voltage for an electrical grid includes two or more energy generation facilities, each of the two or more energy generation facilities including an energy generation facility control unit for controlling the energy generation sources that are associated with that energy generation facility to provide a desired electrical energy output from that energy generation facility.

One embodiment of a system for controlling voltage for an electrical grid includes a power system and one or more Points Of Interconnection (POIs) for each of the two or more energy generation facilities to the power system.

One embodiment of a system for controlling voltage for an electrical grid includes two or more energy generation facility output monitoring data transfer systems for collecting energy generation facility output data from each of the two or more energy generation facilities at their respective POIs, the energy generation facility output data including data indicating the output voltage of each of the two or more energy generation facilities at their respective POIs.

One embodiment of a system for controlling voltage for an electrical grid includes at least one Point Of Utilization (POU) and a POU monitoring data transfer system for collecting POU data from the POU, the POU data including data indicating the voltage at the POU.

One embodiment of a system for controlling voltage for an electrical grid includes two or more control signal data transfer systems for relaying control signals to each of the respective energy generation facility control units for each of the two or more energy generation facilities.

One embodiment of a system for controlling voltage for an electrical grid includes a Master Grid Controller (MGC), the MGC being separate and distinct from the respective energy generation facility control units of each of the two or more energy generation facilities.

In one embodiment, the MGC provides control signals to the respective energy generation facility control units of the two or more energy generation facilities.

In one embodiment, the two or more-energy generation facility output monitoring data transfer systems, the POU monitoring data transfer system, and the two or more control signal data transfer systems are in communication with the MGC.

In one embodiment, the MGC monitors and analyzes the POU data to determine if a voltage at the POU is within a desired POU voltage band.

In one embodiment, if the MGC determines the voltage at the POU is not within the desired POU voltage band, the MGC generates control signals to be sent to each of the respective energy generation facility control units of the two or more energy generation facilities, the control signals being used to adjust voltage control set points of each of the two or more energy generation facilities at their respective POIs to bring the voltage at the POU into the desired POU voltage band.

In one embodiment, the power system can include one or more of; a power distribution system; a power transmission system; Alternating Current (AC) systems or sub-systems; and/or Direct Current (DC) systems or sub-systems.

In one embodiment, the MGC provides at least some of the control signals to the respective energy generation facility control units of the two or more energy generation facilities using one or more wireless data transfer systems.

In one embodiment, the POU monitoring data transfer system collects at least part of the POU data from the POU using one or more wireless data transfer systems.

In one embodiment, the two or more control signal data transfer systems relay control signals to each of the respective energy generation facility control units for each of the two or more energy generation facilities using one or more wireless data transfer systems.

In one embodiment, the two or more energy generation facilities include one or more of a renewable energy-based energy generation facility, a traditional fossil fuel-based energy generation facility; and a nuclear-based energy generation facility.

In one embodiment, the POU is a point distinct from any of the POIs.

In one embodiment, the POU is also a POI for at least one of the two or more energy generation facilities.

In one embodiment, the two or more-energy generation facility output monitoring data transfer systems use one or more wireless data transfer systems for collecting energy generation facility output data from each of the two or more energy generation facilities.

One embodiment of a system for controlling reactive power for an electrical grid includes two or more energy generation facilities, each of the two or more energy generation facilities including an energy generation facility control unit for controlling the energy generation sources that are associated with that energy generation facility to provide a desired electrical energy output from that energy generation facility.

One embodiment of a system for controlling reactive power for an electrical grid includes a power system and one or more Points Of Interconnection (POIs) for each of the two or more energy generation facilities to the power system.

One embodiment of a system for controlling reactive power for an electrical grid includes two or more energy generation facility output monitoring data transfer systems for collecting energy generation facility output data from each of the two or more energy generation facilities at their respective POIs, the energy generation facility output data including data indicating the output voltage of each of the two or more energy generation facilities at their respective POIs.

One embodiment of a system for controlling reactive power for an electrical grid includes at least one Point Of Utilization (POU) and a POU monitoring data transfer system for collecting POU data from the POU, the POU data including data indicating the voltage at the POU.

One embodiment of a system for controlling reactive power for an electrical grid includes two or more control signal data transfer systems for relaying control signals to each of the respective energy generation facility control units for each of the two or more energy generation facilities.

One embodiment of a system for controlling reactive power for an electrical grid includes a Master Grid Controller (MGC), the MGC being separate and distinct from the respective energy generation facility control units of each of the two or more energy generation facilities.

In one embodiment, the MGC provides control signals to the respective energy generation facility control units of the two or more energy generation facilities.

In one embodiment, the two or more-energy generation facility output monitoring data transfer systems, the POU monitoring data transfer system, and the two or more control signal data transfer systems are in communication with the MGC.

In one embodiment, the MGC monitors and compares the energy generation facility output data of each energy generation facility to identify where reactive power is being exchanged between any of the two or more energy generation facilities.

In one embodiment, if the MGC identifies that reactive power is being exchanged between any of the two or more energy generation facilities, the MGC generates control signals to be sent to the respective energy generation facility control units of the two or more energy generation facilities, the control signals being used to reduce the exchanged reactive power between the each of the two or more energy generation facilities.

In one embodiment, the power system can include one or more of; a power distribution system; a power transmission system; Alternating Current (AC) systems or sub-systems; and/or Direct Current (DC) systems or sub-systems.

In one embodiment, the MGC provides at least some of the control signals to the respective energy generation facility control units of the two or more energy generation facilities using one or more wireless data transfer systems.

In one embodiment, the POU monitoring data transfer system collects at least part of the POU data from the POU using one or more wireless data transfer systems.

In one embodiment, the two or more control signal data transfer systems relay control signals to each of the respective energy generation facility control units for each of the two or more energy generation facilities using one or more wireless data transfer systems.

In one embodiment, the two or more energy generation facilities include one or more of a renewable energy-based energy generation facility, a traditional fossil fuel-based energy generation facility; and a nuclear-based energy generation facility.

In one embodiment, the POU is a point distinct from any of the POIs.

In one embodiment, the POU is also a POI for at least one of the two or more energy generation facilities.

In one embodiment, the two or more-energy generation facility output monitoring data transfer systems use one or more wireless data transfer systems for collecting energy generation facility output data from each of the two or more energy generation facilities.

Therefore, the embodiments of the present disclosure provide a solution to the long-standing technical problem of effectively and efficiently controlling power system voltages and reactive power productions to accommodate renewable energy source-based energy generation facilities and the resulting potentially weaker electrical grids.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to convey the substance of their work most effectively and efficiently to others of skill in the art. These operations, while described functionally or logically, are understood to be implemented by computer programs or computing systems.

Furthermore, it has also proven convenient at times to refer to these arrangements of operations as steps or modules or by functional names, without loss of generality.

In addition, the operations shown in the figures, or as discussed herein, are identified using a particular nomenclature for ease of description and understanding, but other nomenclature is often used in the art to identify equivalent operations.

In addition, the operations and/or steps shown in the figures, or as discussed herein, are shown in a particular order for illustrative purposes only. The particular order of the operations and/or steps is not limiting nor is it intended to convey a required order.

Therefore, numerous variations, whether explicitly provided for by the specification or implied by the specification or not, may be implemented by one of skill in the art in view of this disclosure.

What is claimed is:

1. A system comprising:

two or more energy generation facilities, each of the two or more energy generation facilities including an energy generation facility control unit for controlling the energy generation sources that are associated with that energy generation facility to provide a desired electrical energy output from that energy generation facility;

a power system;

one or more Points Of Interconnection (POIs) for each of the two or more energy generation facilities to the power system;

two or more energy generation facility output monitoring data transfer systems for collecting energy generation facility output data from each of the two or more energy generation facilities at their respective POIs, the energy generation facility output data including data indicating the output voltage of each of the two or more energy generation facilities at their respective POIs;

at least one Point Of Utilization (POU);

a POU monitoring data transfer system for collecting POU data from the POU, the POU data including data indicating the voltage at the POU;

two or more control signal data transfer systems for relaying control signals to each of the respective energy generation facility control units for each of the two or more energy generation facilities; and a Master Grid Controller (MGC), the MGC being separate and distinct from the respective energy generation facility control units of each of the two or more energy generation facilities, the MGC providing control signals to the respective energy generation facility control units of the two or more energy generation facilities, the two or more energy generation facility output monitoring data transfer systems, the POU monitoring data transfer system, and the two or more control signal data transfer systems being in communication with the MGC, the MGC monitoring and analyzing the POU data to determine if a voltage at the POU is within a desired POU voltage band wherein, if the MGC determines the voltage at the POU is not within the desired POU voltage band, the MGC generates control signals to be sent to each of the respective energy generation facility control units of the two or more energy generation facilities, the control signals being used to adjust voltage control set points of each of the two or more energy generation facilities at their respective POIs to bring the voltage at the POU into the desired POU voltage band, the MGC monitoring and comparing the energy generation facility output data of each energy generation facility to identify where reactive power is being exchanged between any of the two or more energy generation facilities wherein, if the MGC identifies reactive power is being exchanged between any of the two or more energy generation facilities, the MGC generates control signals to be sent to the respective energy generation facility control units of the two or more energy generation facilities, the control signals being used to reduce the exchanged reactive power between the each of the two or more energy generation facilities.

2. The system of claim 1 wherein the power system can include one or more of:

a power distribution system;

a power transmission system;

Alternating Current (AC) systems or sub-systems; and

Direct Current (DC) systems or sub-systems.

3. The system of claim 1 wherein the MGC provides at least some of the control signals to the respective energy generation facility control units of the two or more energy generation facilities using one or more wireless data transfer systems.

4. The system of claim 1 wherein the POU monitoring data transfer system collects at least part of the POU data from the POU using one or more wireless data transfer systems.

5. The system of claim 1 wherein the two or more control signal data transfer systems relay control signals to each of the respective energy generation facility control units for each of the two or more energy generation facilities using one or more wireless data transfer systems.

6. The system of claim 1 wherein the two or more energy generation facilities includes one or more of:

a renewable energy-based energy generation facility;

a traditional fossil fuel-based energy generation facility; and a nuclear-based energy generation facility.

7. The system of claim 1 wherein the POU is a point distinct from any of the POIs.

8. The system of claim 1 wherein the POU is also a POI for at least one of the two or more energy generation facilities.

9. The system of claim 1 wherein the two or more-energy generation facility output monitoring data transfer systems use one or more wireless data transfer systems for collecting energy generation facility output data from each of the two or more energy generation facilities.

10. A system comprising:

two or more energy generation facilities, each of the two or more energy generation facilities including an energy generation facility control unit for controlling the energy generation sources that are associated with that energy generation facility to provide a desired electrical energy output from that energy generation facility;

a power system;

one or more points of interconnection (POI) for each of the two or more energy generation facilities to the power system;

two or more energy generation facility output monitoring data transfer systems for collecting energy generation facility output data from each of the two or more energy generation facilities at their respective POIs, the energy generation facility output data including data indicating the output voltage of each of the two or more energy generation facilities at their respective POIs and the reactive power provided or absorbed by each of the two or more energy generation facilities;

at least one point of utilization (POU);

a POU monitoring data transfer system for collecting POU data from the POU, the POU data including data indicating the voltage at the POU;

two or more control signal data transfer systems for relaying control signals to each of the respective energy generation facility control units for each of the two or more energy generation facilities, the control signals including output voltage control signals for each of the two or more energy generation facilities; and a Master Grid Controller (MGC), the MGC being a dedicated MGC for the two or more energy generation facilities, the MGC providing control signals to the respective energy generation facility control units of the two or more energy generation facilities, the MGC including:

an MGC data collection module, the MGC data collection module being in communication with the two or more energy generation facility output monitoring data transfer systems to receive the energy generation facility output data, the MGC data collection module being in communication with the POU monitoring data transfer system to receive the POU data;

an MGC data analysis module, the MGC data analysis module being in communication with the MGC data collection module to receive POU data and energy generation facility output data, the MGC data analysis module monitoring and analyzing the POU data to determine if a voltage at the POU is within a desired POU voltage band wherein, if the MGC data analysis module determines the voltage at the POU is not within the desired POU voltage band, the MGC data analysis module generates control signals to be sent to each of the respective energy generation facility control units of each of the two or more energy generation facilities, the control signals being output voltage control signals used to adjust voltage control set points of each of the two or more energy generation facilities at their respective POIs in a manner necessary to bring the voltage at the POU into the desired POU voltage band.

11. The system of claim 10 wherein the power system can include one or more of:

a power distribution system;

a power transmission system;

Alternating Current (AC) systems or sub-systems; and

Direct Current (DC) systems or sub-systems.

12. The system of claim 10 wherein the MGC provides at least some of the control signals to the respective energy generation facility control units of the two or more energy generation facilities using one or more wireless data transfer systems.

13. The system of claim 10 wherein the POU monitoring data transfer system collects at least part of the POU data from the POU using one or more wireless data transfer systems.

14. The system of claim 10 wherein the two or more control signal data transfer systems relay control signals to each of the respective energy generation facility control units for each of the two or more energy generation facilities using one or more wireless data transfer systems.

15. The system of claim 10 wherein the POU is a point distinct from any of the POIs.

16. The system of claim 10 wherein the POU is also a POI for at least one of the two or more energy generation facilities.

17. The system of claim 10 wherein the two or more-energy generation facility output monitoring data transfer systems use one or more wireless data transfer systems for collecting energy generation facility output data from each of the two or more energy generation facilities.

18. A system comprising:

two or more energy generation facilities, each of the two or more energy generation facilities including an energy generation facility control unit for controlling the energy generation sources that are associated with that energy generation facility to provide a desired electrical energy output from that energy generation facility;

a power system;

one or more Points Of Interconnection (POIs) for each of the two or more energy generation facilities to the power system;

two or more energy generation facility output monitoring data transfer systems for collecting energy generation facility output data from each of the two or more energy generation facilities at their respective POIs, the energy generation facility output data including data indicating the output voltage of each of the two or more energy generation facilities at their respective POIs;

at least one Point Of Utilization (POU);

a POU monitoring data transfer system for collecting POU data from the POU, the POU data including data indicating the voltage at the POU;

two or more control signal data transfer systems for relaying control signals to each of the respective energy generation facility control units for each of the two or more energy generation facilities; and a Master Grid Controller (MGC), the MGC being separate and distinct from the respective energy generation facility control units of each of the two or more energy generation facilities, the MGC providing control signals to the respective energy generation facility control units of the two or more energy generation facilities, the two or more energy generation facility output monitoring data transfer systems, the POU monitoring data transfer system, and the two or more control signal data transfer systems being in communication with the MGC, the MGC monitoring and analyzing the POU data to determine if reactive power is being exchanged between any of the two or more energy generation facilities wherein if the MGC identifies reactive power is being exchanged between any of the two or more energy generation facilities, the MGC generates control signals to be sent to the respective energy generation facility control units of the two or more energy generation facilities, the control signals being used to reduce the exchanged reactive power between the each of the two or more energy generation facilities.

19. The system of claim 18 wherein the power system can include one or more of:

a power distribution system;

a power transmission system;

Alternating Current (AC) systems or sub-systems; and

Direct Current (DC) systems or sub-systems.

20. The system of claim 18 wherein the MGC provides at least some of the control signals to the respective energy generation facility control units of the two or more energy generation facilities using one or more wireless data transfer systems.

21. The system of claim 18 wherein the POU monitoring data transfer system collects at least part of the POU data from the POU using one or more wireless data transfer systems.

22. The system of claim 18 wherein the two or more control signal data transfer systems relay control signals to each of the respective energy generation facility control units for each of the two or more energy generation facilities using one or more wireless data transfer systems.

23. The system of claim 18 wherein the POU is a point distinct from any of the POIs.

24. The system of claim 18 wherein the POU is also a POI for at least one of the two or more energy generation facilities.

25. The system of claim 18 wherein the two or more-energy generation facility output monitoring data transfer systems use one or more wireless data transfer systems for collecting energy generation facility output data from each of the two or more energy generation facilities.

26. A method comprising:

providing two or more energy generation facilities, each of the two or more energy generation facilities including an energy generation facility control unit for controlling the energy generation sources that are associated with that energy generation facility to provide a desired electrical energy output from that energy generation facility;

providing a power system;

providing one or more Points Of Interconnection (POIs) for each of the two or more energy generation facilities to the power system;

providing two or more energy generation facility output monitoring data transfer systems;

using the two or more energy generation facility output monitoring data transfer systems to collect energy generation facility output data from each of the two or more energy generation facilities at their respective POIs, the energy generation facility output data including data indicating the output voltage of each of the two or more energy generation facilities;

providing at least one Point Of Utilization (POU);

providing a POU monitoring data transfer system;

using the POU monitoring data transfer system to collect POU data from the POU, the POU data including data indicating the voltage at the POU;

providing two or more control signal data transfer systems;

using the two or more control signal data transfer systems to relay control signals to each of the respective energy generation facility control units for each of the two or more energy generation facilities;

providing a Master Grid Controller (MGC), the MGC being separate and distinct from the respective energy generation facility control units of each of the two or more energy generation facilities;

using the MGC to provide control signals to the respective energy generation facility control units of the two or more energy generation facilities;

putting the two or more energy generation facility output monitoring data transfer systems, the POU monitoring data transfer system, and the two or more control signal data transfer systems in communication with the MGC;

using the MGC to monitor and analyze the POU data to determine if a voltage at the POU is within a desired POU voltage band wherein, if the MGC determines the voltage at the POU is not within the desired POU voltage band, using the MGC to generate control signals and send the control signals to each of the respective energy generation facility control units of the two or more energy generation facilities, the control signals being used to adjust voltage control set points of each of the two or more energy generation facilities to bring the voltage at the POU into the desired POU voltage band;

using the MGC to monitor and compare the energy generation facility output data of each energy generation facility to identify where reactive power is being exchanged between any of the two or more energy generation facilities wherein, if the MGC identifies reactive power is being exchanged between any of the two or more energy generation facilities, using the MGC to generate control signals and send the control signals to the respective energy generation facility control units of the two or more energy generation facilities, the control signals being used to reduce the exchanged reactive power between the each of the two or more energy generation facilities.

27. The method of claim 26 wherein the MGC provides at least some of the control signals to the respective energy generation facility control units of the two or more energy generation facilities using one or more wireless data transfer systems.

28. The method of claim 26 wherein the POU monitoring data transfer system collects at least part of the POU data from the POU using one or more wireless data transfer systems.

29. The method of claim 26 wherein the two or more control signal data transfer systems relay control signals to each of the respective energy generation facility control units for each of the two or more energy generation facilities using one or more wireless data transfer systems.

* * * * *